(12) United States Patent
Jeon et al.

(10) Patent No.: US 11,566,800 B2
(45) Date of Patent: Jan. 31, 2023

(54) AIR PURIFIER AND AIR PURIFYING SYSTEM

(71) Applicants: LG ELECTRONICS INC., Seoul (KR); CHUNGANG UNIVERSITY INDUSTRY ACADEMIC COOPERATION FOUNDATION, Seoul (KR)

(72) Inventors: Jongkeon Jeon, Seoul (KR); Haeyoong Chung, Seoul (KR); Jiyoung Kang, Seoul (KR); David Kangseong Lee, Seoul (KR); Daeyoung Kwak, Seoul (KR); Sohee Park, Seoul (KR)

(73) Assignees: LG ELECTRONICS INC., Seoul (KR); CHUNGANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 288 days.

(21) Appl. No.: 16/821,197

(22) Filed: Mar. 17, 2020

(65) Prior Publication Data

US 2020/0298169 A1    Sep. 24, 2020

(30) Foreign Application Priority Data

Mar. 19, 2019 (KR) .......................... 10-2019-0031483
Jul. 29, 2019 (KR) .......................... 10-2019-0091547

(51) Int. Cl.
*F24F 8/80* (2021.01)
*A47L 5/24* (2006.01)
(Continued)

(52) U.S. Cl.
CPC .................. *F24F 8/80* (2021.01); *A47L 5/24* (2013.01); *A47L 9/122* (2013.01); *A47L 9/322* (2013.01);
(Continued)

(58) Field of Classification Search
CPC ................ B01D 46/24; B01D 46/2403; B01D 46/0002; B01D 46/0004; B01D 46/0005;
(Continued)

(56) References Cited

U.S. PATENT DOCUMENTS 4,832,716 A    5/1989 McMichael
5,524,321 A    6/1996 Weaver et al.
(Continued)

FOREIGN PATENT DOCUMENTS

CA    2 087 056    7/1994
CN    2124670    12/1992
(Continued)

OTHER PUBLICATIONS

European Search Report dated Aug. 20, 2020 issued in Application No. 20160853.6.

(Continued)

*Primary Examiner* — Robert Clemente
(74) *Attorney, Agent, or Firm* — KED & Associates, LLP

(57) ABSTRACT

A handheld air purifier may include a suction body provided with a suction surface having a first and second frame, a fan to suction air, and a filter to filter suctioned air, a bending portion extending rearward from the suction body to bend upward, and a handle extending further from the bending portion and held by the user. The second frame may be provided behind the first frame and may include a protrusion that penetrates through the first frame to create a gap between the suction surface and a garment being treated to promote a free airflow through the handheld air purifier.

16 Claims, 13 Drawing Sheets

(51) Int. Cl.
*A47L 9/12* (2006.01)
*A47L 9/32* (2006.01)
*B01D 46/00* (2022.01)
*B01D 46/42* (2006.01)
*B01D 46/44* (2006.01)
*F24F 8/108* (2021.01)

(52) U.S. Cl.
CPC ..... *B01D 46/0005* (2013.01); *B01D 46/0043* (2013.01); *B01D 46/4227* (2013.01); *B01D 46/4245* (2013.01); *B01D 46/442* (2013.01); *F24F 8/108* (2021.01); *B01D 2273/30* (2013.01)

(58) Field of Classification Search
CPC ............ B01D 46/0043; B01D 46/0049; B01D 46/58; B01D 46/60; B01D 46/62; B01D 46/64; B01D 46/442; B01D 2279/50; B01D 2267/60; B01D 2267/30; B01D 46/4245; B01D 46/4254; F24F 8/10; F24F 8/108; F24F 1/0071; F24F 1/0073; F24F 1/035; F24F 2221/12
See application file for complete search history.

(56) References Cited

U.S. PATENT DOCUMENTS

| | | | |
|---|---|---|---|
| 5,803,940 A * | 9/1998 | Rick | F24F 1/0071 55/467 |
| 6,660,070 B2 | 12/2003 | Chung et al. | |
| 8,302,251 B2 | 11/2012 | Beskow et al. | |
| 10,323,855 B2 | 6/2019 | Jung et al. | |
| 10,563,667 B2 | 2/2020 | Park et al. | |
| 10,695,706 B2 | 6/2020 | Cho et al. | |
| 10,697,665 B2 | 6/2020 | Jung et al. | |
| 2004/0200007 A1 | 10/2004 | Heim | |
| 2007/0221061 A1 * | 9/2007 | Steiner | F24F 8/10 55/467 |
| 2008/0300154 A1 | 12/2008 | Duchesne et al. | |
| 2009/0007368 A1 | 1/2009 | Oh | |
| 2009/0248208 A1 | 10/2009 | Fukushima et al. | |
| 2010/0242209 A1 | 9/2010 | Beskow et al. | |
| 2011/0083757 A1 * | 4/2011 | Shore | F24F 1/0073 361/679.01 |
| 2011/0083767 A1 | 4/2011 | Johnson | |
| 2018/0211168 A1 | 7/2018 | Khurshudov et al. | |
| 2019/0274509 A1 | 9/2019 | Moyher, Jr. et al. | |
| 2022/0061621 A1 | 3/2022 | Weyant et al. | |
| 2022/0142435 A1 | 5/2022 | Moyher, Jr. et al. | |

FOREIGN PATENT DOCUMENTS

| | | |
|---|---|---|
| CN | 1091183 | 8/1994 |
| CN | 1636494 | 7/2005 |
| CN | 1718272 | 1/2006 |
| CN | 1922352 | 2/2007 |
| CN | 101182674 | 5/2008 |
| CN | 201337394 | 11/2009 |
| CN | 201482748 | 5/2010 |
| CN | 201615550 | 10/2010 |
| CN | 201624612 | 11/2010 |
| CN | 103479296 | 1/2014 |
| CN | 103582442 | 2/2014 |
| CN | 203852751 | 10/2014 |
| CN | 104159384 | 11/2014 |
| CN | 104832996 | 8/2015 |
| CN | 105202646 | 12/2015 |
| CN | 105465918 | 4/2016 |
| CN | 105674417 | 6/2016 |
| CN | 105 962 842 | 9/2016 |
| CN | 106466173 | 3/2017 |
| CN | 206138051 | 5/2017 |
| CN | 106958873 | 7/2017 |
| CN | 206347659 | 7/2017 |
| CN | 107019483 | 8/2017 |
| CN | 107110530 | 8/2017 |
| CN | 207821786 | 9/2018 |
| CN | 108937823 | 12/2018 |
| CN | 109247770 | 1/2019 |
| CN | 208355430 | 1/2019 |
| CN | 109442619 | 3/2019 |
| CN | 110857807 | 3/2020 |
| CN | 111473459 | 7/2020 |
| CN | 111720915 | 9/2020 |
| DE | 10-2017-206356 | 10/2018 |
| EP | 3211338 | 8/2017 |
| EP | 3237809 | 11/2017 |
| JP | H08-187660 | 7/1996 |
| JP | H11-267416 | 10/1999 |
| JP | 2002-292226 | 10/2002 |
| JP | 3129636 | 3/2007 |
| JP | 10-2017-0019895 | 2/2017 |
| JP | 2017-40448 | 2/2017 |
| KR | 10-2006-0089191 | 8/2006 |
| KR | 10-2016-0147301 | 12/2016 |
| KR | 10-2017-0019895 | 2/2017 |
| KR | 10-2018-0052794 | 5/2018 |

OTHER PUBLICATIONS

European Search Report dated Aug. 14, 2020 issued in Application No. 20160997.1.
Chinese Office Action dated Sep. 10, 2021 issued in Application No. 202010190698.3.
Chinese Office Action issued in Application No. 202010191311.6 dated Jan. 13, 2022.
Chinese Office Action dated May 21, 2021 issued in CN Application No. 202010118682.1.
European Search Report dated Aug. 20, 2020 issued in Application No. 20161002.9.
Chinese Office Action issued in Application No. 202010190698.3 dated Mar. 22, 2021.
Chinese Office Action issued in Application No. 202010191311.6 dated Mar. 24, 2021.
United States Office Action dated Sep. 28, 2022 issued in co-pending related U.S. Appl. No. 16/821,087.
Chinese Notice of Allowance dated Apr. 13, 2022 issued in CN Application No. 202010190698.3.
U.S. Appl. No. 16/821,087, filed Mar. 17, 2020.
U.S. Appl. No. 16/821,124, filed Mar. 17, 2020.
U.S. Appl. No. 16/821,197, filed Mar. 17, 2020.
Chinese Notice of Allowance dated Apr. 20, 2022 issued in CN Application No. 202010191311.6.
United States Office Action dated Nov. 18, 2022 issued in co-pending related U.S. Appl. No. 16/821,124.

* cited by examiner

_AIR PURIFIER AND AIR PURIFYING SYSTEM_

CROSS-REFERENCE TO RELATED APPLICATION(S)

This application claims priority under 35 U.S.C. § 119 to Korean Application Nos. 10-2019-0031483 filed on Mar. 19, 2019 and 10-2019-0091547 filed on Jul. 29, 2019, whose entire disclosure(s) is/are hereby incorporated by reference.

BACKGROUND

1. Field

An air purifier and an air purifying system is disclosed herein.

2. Background

An air purifier or cleaner may be a device that suctions contaminated air, purifies or filters contaminated air, and then discharges purified air. The air purifier may include a fan to suction ambient air inside of the air purifier and a filter to filter dust, germs, and other foreign matter in the air. Generally, an air purifier is configured to purify an interior or indoor space such as a home or office.

Certain pollutants entering indoor spaces come from clothes worn by people entering the indoor space. KR10-2006-0089191 discloses a 'Multifunctional dryer with ultra-high speed hair, hand, body drying and dust removal (air wash) and air purifier.' The multifunctional dryer device of KR10-2006-0089191 blows air generated in a fan or blower through an opening formed in a wall toward clothes and a person, thereby blowing and scattering foreign matter away from the clothes but into the indoor space. The scattering dust may be blown away along with dust accumulating in the blower opening, which may further pollute the indoor space.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in, which like reference numerals refer to like elements wherein.

DETAILED DESCRIPTION

Figure 1:
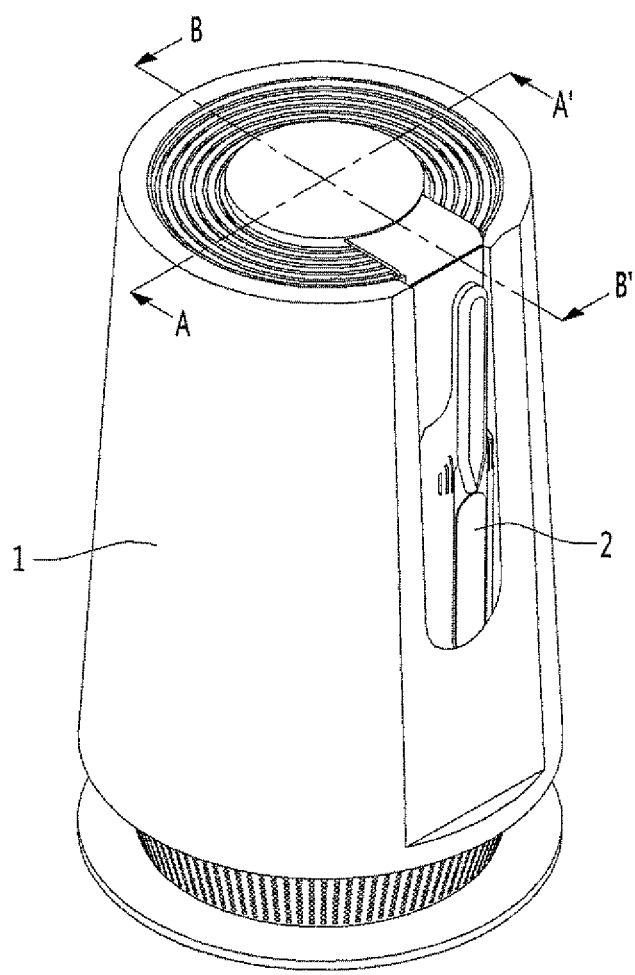
FIG. 1 is a perspective view of an air purifying system according to an embodiment.

Referring to FIG. 1, an air purifying or cleaning system according to an embodiment may include a main air purifier or cleaner 1 capable of performing a purifying action or operation with respect to a large volume of air, and a handheld air purifier or cleaner 2 having a smaller air purifying capacity than that of the main air purifier 1 and capable of performing a purifying action or operation on a smaller volume of air than the main air purifier 1.

While the main air purifier 1 may be in a fixed position, the handheld air purifier 2 may be easily held by a user and moved to target specific objects to be cleaned. The handheld air purifier 2 may also be referred to as a moveable, mobile, or portable air purifier or a dust vacuum. The main air purifier 1 may be heavier and more difficult to handle than the handheld air purifier 2 and may have a wired connection to an external or commercial power supply (e.g., a wall socket), but the main air purifier 1 may still be carried and moved or adjusted. Alternatively, the main air purifier 1 may be more rigidly fixed to a wall or floor.

The main air purifier 1 may have a relatively large cleaning capacity and the handheld air purifier 2 may have a relatively small cleaning capacity, where cleaning capacity here means a maximum cleaning capacity per unit time. Air cleaning or purifying capacities may be measured by cubic feet of air per minute or CFM.

The main air purifier 1 and the handheld air purifier 2 may each include fans or blowers (35 in FIGS. 3 and 160 in FIG. 4) to suction air. The main and handheld air purifiers 1 and 2 may be configured such that, if the fan inside the handheld air purifier 2 is rotated at a maximum speed and the fan inside the main air purifier 1 is rotated at a minimum speed, a current cleaning capacity of the handheld air purifier 2 may be equal to or larger than a current cleaning capacity of the main air purifier 1. Alternatively, in such a case, the current cleaning capacity of the handheld air purifier 1 may still be less than the current cleaning capacity of the main air purifier 1.

The main air purifier 1 may be strategically placed to keep an entire indoor living space more clean. For example, the main air purifier 1 may be placed in a frequently traveled indoor space (e.g., hallway, foyer, family room), a central indoor space (e.g., a family room, living room, foyer, or hallway), a particularly dirty place (e.g., kitchen or near a door leading outside), or a space exposed to clothing or shoes (e.g., a closet or foyer). Placement of the main air purifier 1 is not limited to the above-described rooms.

The handheld air purifier 2 may be hand-held and portable by a user so that the user may target a specific object, surface, or area. The handheld air purifier 2 may be configured to remove dust from clothes or other objects. The handheld air purifier 2 may suction air at a surface of clothes to filter out foreign substances and then discharge purified air.

The main air purifier 1 may operate independently from the handheld air purifier 2 when the handheld air purifier 2 is mounted on the main air purifier 1. The handheld air purifier 2 may be mounted on an outer wall or surface rather than inside of the main air purifier 1. By mounting the handheld air purifier 2 on the outer surface of the main air purifier 1, the user may conveniently pick up and use the handheld air purifier 2.

The handheld air purifier 2 may not operate while mounted on the main air purifier 1 to save power consumption, although a user may control the handheld air purifier 2 to operate regardless of a position or mounting status of the handheld air purifier 2. The handheld air purifier 2 may communicate with the main air purifier 1 via, e.g., a wired communication while mounted or a wireless communication like BlueTooth or WiFi regardless of mounting status. The handheld air purifier 2 may be charged when mounted on the main air purifier 1 via a wired connection or via a wireless power transfer (WPT) method (e.g., electromagnetic induction method). The main air purifier 1 may be configured to connect to a commercial or external power supply (e.g., wall socket).

Figure 2:
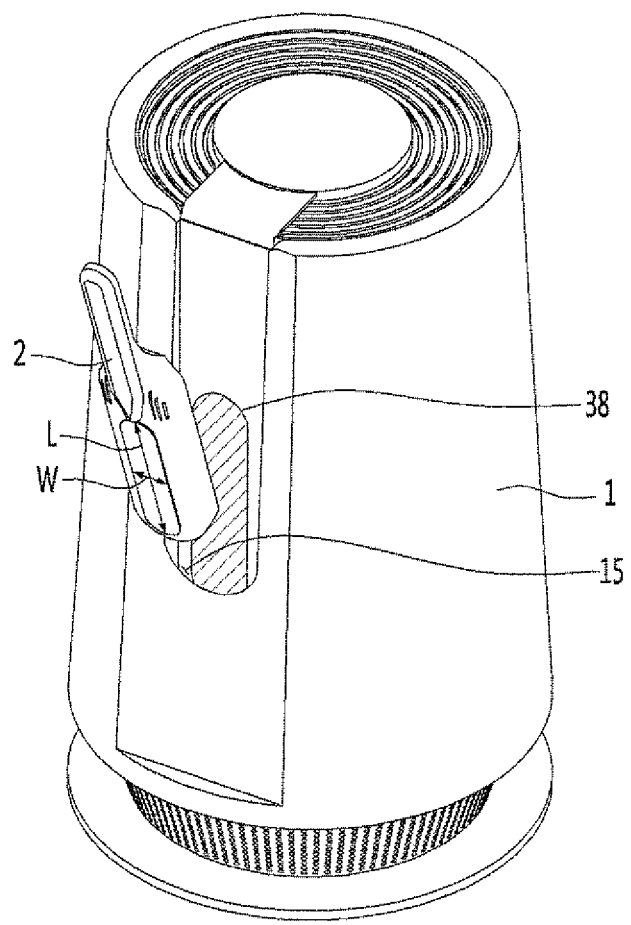
FIG. 2 is a view showing a handheld air purifier separated from a main air purifier.
Figure 3:
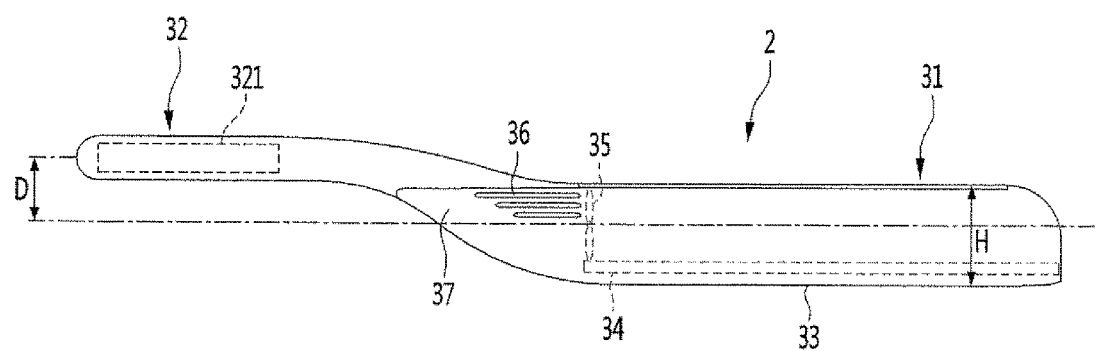
FIG. 3 is a front view of the handheld air purifier.

Referring to FIGS. 2 and 3, a portion of the outer surface of the main air purifier 1 may be a mounting portion 15. The mounting portion 15 may be recessed inward from the outer surface of the main air purifier 1 to support a front face of the handheld air purifier 2. The handheld air purifier 2 may be inserted into the mounting portion 15 to be supported, or alternatively the handheld air purifier 2 may hang from an edge of the mounting portion 15.

The mounting portion 15 may be not completely circular and may have shapes similar to an oval, elliptical, or stadium (i.e., rectangular with semicircular ends). As viewed from an interior of the main air purifier 1, the mounting portion 15 may be an inclined or curved surface that serves as an air guide structure. Alternatively, the mounting portion 15 may not protrude too far into an interior of the main air purifier 1 so as not to interfere with the air flow.

The mounting portion 15 may include a light 38 provided at a position where the handheld air purifier 2 is placed during mounting. For example, the light 38 may align with a face or suction surface 33 of the handheld air purifier 2 when the handheld air purifier 2 is mounted on the mounting portion 15. The light 38 may include a light or position sensor to sense when handheld air purifier 2 is mounted or detached. In addition, the light 38 may include a sensor to sense an amount of light present in the room where the main air purifier 1 is placed, and may turn on automatically to emit light when the handheld air purifier 2 is detached and the room is relatively dark (i.e., a light level is measured to be less than or equal to a predetermined light level).

The light 38 may be or include an ultraviolet light device (e.g., ultraviolet light emitting diode or UV LED) configured to sterilize the handheld air purifier 2 once the handheld air purifier 2 is mounted. The ultraviolet light device may sterilize at least a portion of the handheld air purifier 2 (e.g., the suction surface 33) when the handheld air purifier 2 is mounted.

The handheld air purifier 2 may include a suction body 31 formed to be long in a first direction (i.e., a longitudinal direction) and a handle 32 extended in the first direction from the suction body 31. The handle 32 may be sized and shaped to be easily gripped by a user's hand. The suction body 31 may have the suction surface 33.

A wireless charging module may be provided in the mounting portion 15 below the light 38. The handheld air purifier 2 may be also provided with a wireless charging module (e.g., in the suction body 31 or in the handle 32) so that the handheld air purifier 2 may be wirelessly charged. For example, the wireless charging module in the mounting portion 15 may include a wireless power transceiver or transmitter, and the wireless charging module of the handheld air purifier 2 may include a wireless power transceiver or receiver. The wireless charging modules of the main air purifier 1 and the handheld air purifier 2 may align when the handheld air purifier 2 is mounted on the main air purifier 1. Alternatively or in addition thereto, a wired charging terminal may be provided in the mounting portion 15 to align with and contact a charging terminal of the handheld air purifier 2, or as another alternative, one of the main air purifier 1 or the handheld air purifier 2 may have a wire to connect charging terminals. In yet another alternative, the handheld air purifier 2 may be configured to plug into a wall socket.

A battery 321 may be provided inside the handle 32 in order to store energy supplied from the main air purifier 2. The battery 321 may be charged via the wireless charging module of the handheld air purifier 2.

The suction body 31 may have a long bar shape in the first direction. A front surface of the suction body 31 may have a suction surface 33 provided in a flat two-dimensional planar structure. A filter 34 may be fixed to an inner or rear side of the suction surface 33 so that foreign matter can be filtered out from air suctioned through the suction surface 33. The suction surface 33 may include at least one hole or opening through which air may enter an inside of the handheld air purifier 2. A size and shape of the filter 34 may correspond to a size and shape of the suction surface 33.

A bending or connection portion 37 bend or curve between the suction body 31 and the handle 32. A side of the bending portion 37 coupled to the suction body 31 may be provided further in a second direction than a side of the bending portion 37 coupled to the handle 32, where the second direction is a direction perpendicular to the first direction. For convenience of description, the second direction will be referred to as a vertical direction with respect to an orientation illustrated in FIG. 3, but one of ordinary skill in the art will understand that a user is not limited to using the handheld air purifier 2 in the orientation shown in FIG. 3.

With reference to FIG. 3, the handle 32 may be positioned above the suction body 31. When the suction surface 33 is applied to a surface to be clean (e.g., clothes), the handle 32 may not contact the surface. The user may not need to press the handle 32 downward excessively toward the surface, reducing the possibility of contaminants touching a hand gripping the handle 32. A central axis of the handle 32 in the first direction may be provided above a central axis of the suction member 31 in the first direction by a distance D.

At least one of the bending portion 37 and the suction body 31 may be provided with a discharge port 36 through which clean air filtered by the filter 34 may be discharged. The discharge port 36 may be provided at rear (i.e., upper) and/or side surfaces of the suction body 31 and/or the bending portion 37, and may include at least one hole or opening through which air from inside the handheld air purifier 2 is discharged. As an example, the discharge port 36 may have openings on left and right sides of the bending portion 37. Alternatively, the discharge port 36 may be provided on the handle 32.

A position of the discharge port 36 may be configured so that air discharged from the discharge port 36 may be prevented from reaching clothes, which the suction surface 33 may face, to prevent scattering of dust still on the clothes. An overall pollution of an indoor environment may be reduced by limiting an amount of air that is blown directly toward the clothes and instead suctioning air near clothes through the filter 34.

A fan 35 may be provided inside the suction body 31 at a position in the first direction between the discharge port 36 and a majority of the filter 34. As shown in FIG. 3, the fan 35 may be provided at an end of the filter 34 closest to the discharge port 36, and an axis of the fan 35 around which blades rotate may extend in the first direction. However, the orientation and position of the fan 35, discharge port 36, and filter 34 is not limited to those shown in FIG. 3. For example, the discharge port 36 may be provided at a rear of the suction body 31, the filter 34 may be provided behind the front of the suction body 31 such that the discharge port 36 faces the filter 34, and the fan 35 may be provided between the filter 34 and the discharge port 36 and oriented to face the filter 34 such that the axis of the fan 35 extends in the vertical direction.

The fan 35 may create a negative pressure to suction air through the suction surface 33 and through the filter 34 to remove foreign matter like dust from a surface to which the suction surface 33 is applied. The suction body 31 may have a shape configured to easily suck foreign matter attached to clothes. A height H of the suction body 31 in the second direction may be less than a width of the suction body in a third direction that is perpendicular to the first and second directions. The width may be less than a length of the suction body 31 in the first (i.e., longitudinal) direction. The width may be a distance between side surfaces of the suction body 31.

The length of the suction body 31 may be longer than a length of the handle 32. Dust may be removed from a large surface area by holding the handle 31 and waving the handle 31 across the surface to left and right sides. Since the width of the suction body 31 may be larger than the height H, dust may be suctioned from a particular area for a longer time. The height H of the suction body 31 may help to form or define a passage of air flow, and the height H of the suction body 31 may be minimized when the fan 35 has the orientation and position shown in FIG. 3 (i.e., between an end of the filter 34 provided behind the suction surface 33 and the discharge port 36 provided at sides of the bending portion 37).

The handheld air purifier 2 may optionally include a motor, a HEPA filter, and a dust bin to collect dust suctioned into the handheld air purifier 2, and may alternatively be referred to as a vacuum cleaner. The handheld air purifier 2 may optionally include a removable nozzle or hose.

Figure 4:
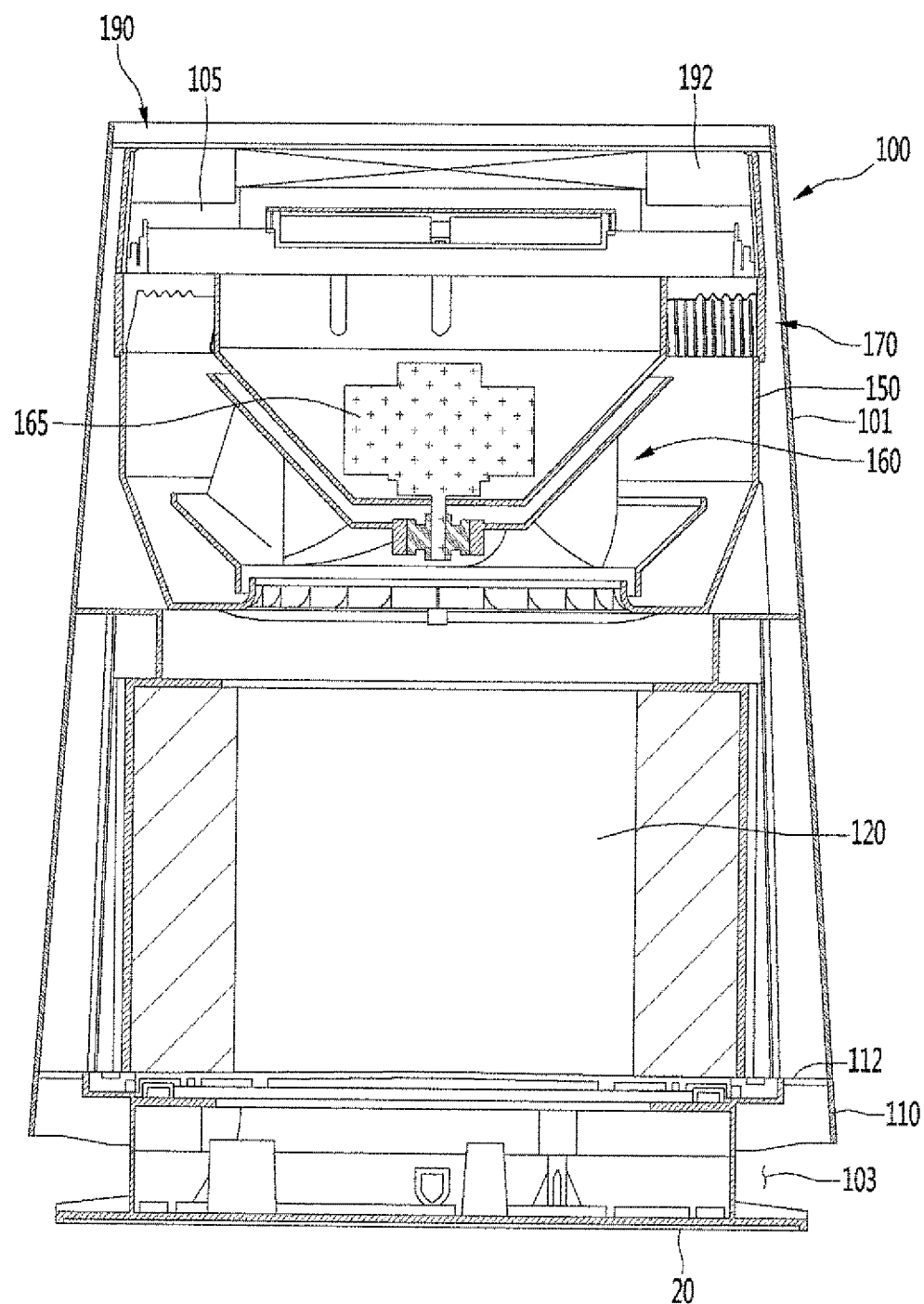
FIG. 4 is a cross-sectional view taken along line A-A' in FIG. 1.
Figure 5:
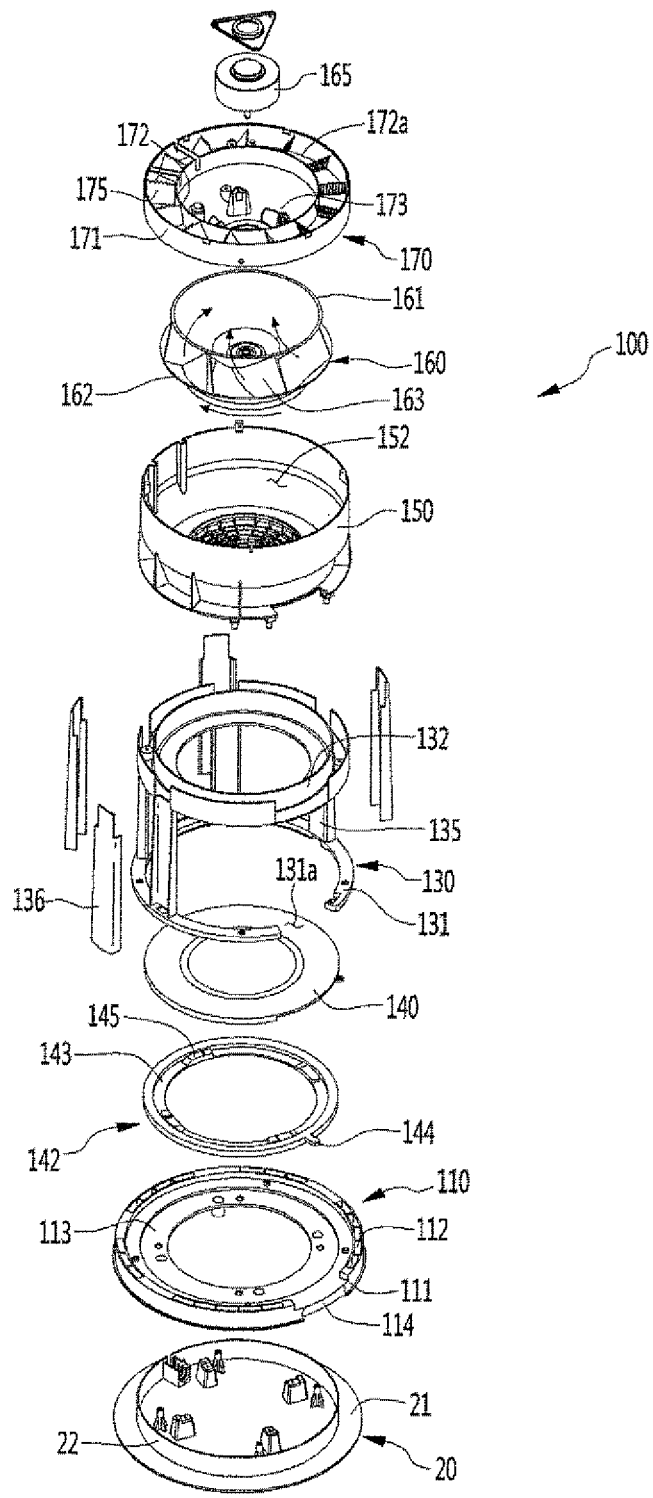
FIG. 5 is an exploded perspective view of an internal configuration of the main air purifier.

FIG. 4 is a cross-sectional view taken along the line A-A' of FIG. 1 showing an internal structure of the main air purifier, and FIG. 5 may be understood as a state in which the case 101 and the discharge guide device 190 from FIG. 4 are removed. Referring to FIGS. 4 and 5, a blower or suction assembly 100 may have a circular cross-sectional structure corresponding to a circular cross-sectional structure of an interior of the main air purifier 1. The suction assembly 100 may generate an air flow. Ambient air present in the room where the main air purifier 1 is placed may be suctioned through a lower side of the main air purifier 1, filtered, and discharged through an upper side of the main air purifier 1.

The main air purifier 1 may include a case 101 forming an outer structure or surface. The case 101 may have a cylinder shape or as a truncated cone shape having a diminishing diameter from a bottom end to a top end.

The case 101 may include a separating device or lock in which two separate shells constituting the case 101 are joined or separated to open and close the case 101. The case 101 may further include a hinge portion provided at a side of the case 101 opposite to a side of the case 101 having the lock so that the two shells may rotate about the hinge during opening and closing. When the case 101 is opened, the case 101 may further be separated or removed from the main air purifier 1 for replacement. The case 101 may also be opened to replace or repair internal devices (e.g., the blowing assembly 100) of the main air purifier 1.

A vertical direction as shown in FIG. 4 may be referred to as an axial direction, and a horizontal direction may be referred to as a radial direction. The axial direction may correspond to a central axis direction (i.e., a motor axial direction) of the fan 160. The radial direction may be perpendicular to the axial direction. A circumferential direction may be a circular direction rotating about the axial direction with a turning radius in the radial direction.

The main air purifier 1 may include a base 20 provided below the case 101. The base 20 may be configured to be placed on a floor or ground surface and to support the case 101 and the rest of the main air purifier 1. A bottom surface of the base 20 may be spaced downward from a lower end of the case 101 to form a base side suction portion 103 between the lower end of the case 101 and the bottom surface of the base 20.

A suction grill 110 may be provided below a bottom end of the case 101 and at an upper portion or side of the base 20. A suction port 112 may be formed at an edge of the suction grill 110. The base suction portion 103 may be a space between the base 20 and the suction grill 110, and may include or communicate with a suction port 112 formed in the suction grill 110. Air suctioned through the base side suction portion 103 may flow upward through a suction port 112.

A discharge port or portion 105 may be formed in an upper portion of the main air purifier 1. The discharge portion 105 may be formed in a discharge grill of a discharge guide device or discharge guide 190. The discharge grill of the discharge guide 190 may form an upper end or surface of the main air purifier 1.

Air discharged through the discharge portion 105 may flow upward in the axial direction toward the discharge guide 190 to be spread radially by the discharge grill 192. The discharge grill 192 may be formed of openings arranged in a spiral shape so that air discharged through the discharge grill 192 may have a speed or velocity component in the circumferential direction.

The base 20 may include a base body 21 placed on the floor and a base protrusion or flange 22 protruding upward from the base body 21. The suction grill 110 may be placed on the base protrusion 22. The base protrusion 22 may surround engagement devices provided on an upper surface of the base body 21 and configured to couple to holes formed in and/or engagement devices on a bottom of the grill body 111. The base protrusion 22 may space apart the base body 21 and the suction grill 110. The base side suction portion 103 may form an air suction space provided adjacent to the base body 21 and flange 22, the suction grill 110, and/or a bottom end of the case 101.

The suction grill 110 may include a grill body 111 having an approximate ring shape. The suction port 112 may be formed through an outer edge or rim of the grill body 111. A plurality of suction ports 112 may be spaced apart from each other along the outer rim of the grill body 111. The plurality of suction ports 112 may communicate with the base side suction port 103.

The main air purifier 1 may include a filter 120 provided above the suction grill 110 to filter air entering through the suction ports 112 and base side suction port 103.

Air may flow through a filter surface (i.e., an outer peripheral surface) of the filter 120 to an interior thereof. The filter 120 may be cylindrical, but embodiments disclosed herein are not limited thereto.

The suction grill 110 may include a lever support portion or inner edge 113 to form an upper surface of the grill body 111 and to support a lever or locking device 142. The lever support portion 113 may be an inner radial edge recessed downward from an outer portion or edge of the grill body 111. An outer peripheral surface of the grill body 111 may have a groove or opening 114. The groove 114 may provide a space in which a handle or protrusion 144 of the lever device 142 may move.

The lever device 142 may be provided on the suction grill 110 and may be operated by a user. The lever device 142 may include a lever body 143 having a ring shape, and the lever device 142 may be rotated with respect to the suction grill 110 via the handle 144. The filter 120 may be provided on a filter support or support device 140, which may be seated on the lever body 143 of the lever device 142. When the lever device 142 is rotated clockwise or counterclockwise, the filter support 140 may be raised or lowered to fix and loosen the filter 120 for securing and removal.

The lever body 143 may include a lever protrusion or lock 145 protruding upward from an outer edge or rim of an upper surface of the lever body 143. There may be a plurality of lever protrusions 145 provided on the lever body 143 that are spaced apart from each other in the circumferential direction. Each lever protrusion 145 may have an inclined surface that is inclined upward or downward in the circumferential direction. The lever protrusions 145 may engage with a bottom of the filter support 140.

The handle 144 may protrude in the radial direction from the outer edge or an outer peripheral surface of the lever body 143. The user may hold the handle 144 and rotate the lever body 143 clockwise or counterclockwise by rotating the handle 144 in the groove 114.

The filter support 140 may be configured to hold or support the filter 120, and the lever device 142 may support the bottom of the filter support 140. The bottom of the filter support 140 may include a support protrusion that protrudes downward from an outer edge to contact or engage with the lever protrusion 145. There may be a plurality of support protrusions corresponding to the plurality of lever protrusions 145. Each support protrusion may have an inclined surface upward or downward in the circumferential direction.

When the lever body 143 is rotated via the handle 144, the lever protrusion 145 may be rotated with respect to the support protrusions of the filter support 140. When an upper or higher portion of the lever protrusion 145 abuts or contacts a lower portion of the support protrusion, the filter support 140 may be pushed upward to fix a position of the filter 120. In such a configuration, the inclined surfaces of the lever protrusion 145 and the support protrusion may not exactly align. When a lower portion of the lever projection 145 contacts or abuts an upper or higher portion of the support protrusion, the filter support 140 may descend downward. In such a configuration, the inclined surfaces of the lever protrusion 145 and the support protrusion may be aligned. When the filter support 140 is descended downward, a space may be formed so that the filter 120 may be removed from the main air purifier 1.

The main air purifier 1 may further include a filter frame 130, which may form a space in which the filter 120 may be mounted. The filter frame 130 may include a first or lower frame 131 forming a lower portion of the filter frame 130 and a second or upper frame 132 forming an upper portion of the filter frame 130.

The first frame 131 may have an approximate ring shape. An inner space of the first frame 131 may form at least a part of an air flow passage or channel passing through the filter frame 130.

The lever device 142 and the filter support 140 may be provided within an inner circumferential surface of the first frame 131. An upper surface of the filter support 140 may include a seating surface on which the filter member 120 is placed. The first frame 131 may include a cutout portion or a handle space 131a that allows movement of the handle 144 of the lever device 142. The handle 144 may be rotated clockwise or counterclockwise in the handle space 131a to rotate the filter support 140.

The second frame 132 may be provided above and spaced apart from the first frame 131. The second frame 132 may have an approximate ring shape. An inner space of the second frame 132 may form at least a part of the air flow passage passing through the filter frame 130. An upper portion or surface of the second frame 132 may support a fan housing 150, which will be described later.

The filter frame 130 may further include a side support or wall 135 extending between rims of the first frame 131 and the second frame 132. The first and second frames 131 and 132 may be spaced apart from each other by the side support 135. A plurality of side supports 135 may be arranged in the circumferential direction and spaced apart from each other. A shape of the side supports 135 may resemble a partial arc and have a curvature matching a curvature of the first and second frames 131 and 132. A support cover 136 may be coupled to an outer surface of the side support 135.

A mounting space of the filter 120 may be defined by the first and second frames 131 and 132 and the plurality of side supports 135. Shapes of the first and second frames 131 and 132 and the side supports 135 may not be limited to circles to create a cylindrical mounting space for a cylindrical filter 120, and may be configured to correspond to alternative filter 120 shapes. For example, the filter 120 may have a cuboid shape, a curved cube or rectangle shape, or an ellipsoid shape, and the first and second frames 131 and 132 may have a square shape or rectangle shape, a curved square shape, cushion shape, or stadium shape, or an elliptical shape, respectively.

The filter 120 may be detachably mounted or seated in the mounting space. Air may be introduced through an outer peripheral (e.g., circumferential) surface of the filter 120. In the process of passing through the filter 120, impurities such as fine dust, dirt, or other debris in the air may be filtered. Air may be introduced into the filter 120 from any direction or at any angle with respect to the filter member 120. Accordingly, the filtering area of the air may be increased.

A mounting space may have a shape (e.g., cylindrical) corresponding to the shape of the filter 120. The filter 120 may be slidably received in the mounting space during a mounting or attachment process, and may be slidably drawn out from the mounting space in a separating or removal process.

During removal, the handle 144 may be operated to lower the filter support 140 and filter 120 into a release position. A vertical space or distance between the filter support 140 and the second frame 132 may be increased, and the filter 120 may be pulled or slid radially outward and separated from the mounting space.

During replacement, the filter 120 may be pushed or slid radially inward into the mounting space and may be placed on the upper surface of the filter support 140. The handle 144 may be operated to raise the filter support 140 and the filter 120 to an engagement position. The vertical distance between the filter support 140 and the second frame 132 may be decreased to secure the filter 120 between the filter support 140 and the second frame 132.

A suction pressure may be provided by a fan 160 to suction air through the base side suction portion 103 and through the filter 120. The fan 160 may be provided above the filter 120 to suction air upward.

A fan housing 150 may be provided at an outlet side (i.e., above) the filter 120. The fan 160 may be provided in the fan housing 150. The fan housing 150 may be supported by the second frame 132 of the filter frame 130.

An inner surface of a lower portion of the fan housing 150 may include a fan guide or fan recess 152, which may have an inner contour or shape configured to guide an inflow of air into the fan housing 150. A lower or bottom portion of the fan recess 152 may include a grill to prevent fingers or other objects from going into the fan housing 150 during removal and insertion of the filter 120.

The fan 160 may be or include a centrifugal fan to suction air in the axial direction and to discharge air upward in the radial direction. The fan 160 may include a hub 161 coupled to a rotation shaft of a fan motor 165, which may be a centrifugal fan motor. A plurality of shrouds 162 may be provided at an outer side of the hub 161, and a plurality of blades 163 may be provided or formed between the shrouds 162. The fan motor 165 may be coupled to the fan 160.

The hub 161 may have a bowl shape having a diameter or cross-sectional area that decreases in a downward direction. The hub 161 may include a shaft coupling portion to which the rotation shaft of the fan motor 165 is coupled and a first blade coupling portion that extends upward from the shaft coupling portion in an inclined manner.

The shroud 162 may include a shroud suction port provided at a bottom or lower end to suck air that has passed through the fan recess 152. A second blade coupling portion may extend upward from the lower end of the shroud 162.

One side of the blade 163 may be coupled to the first blade coupling portion of the hub 161 and the other side of the blade 163 may be coupled to the second blade coupling portion of the shroud 162. The plurality of blades 163 may be spaced apart from each other in the circumferential direction of the hub 161.

Air passing through the filter 120 may flow upward into the fan housing 150 through the fan recess 152. The air may flow in the axial direction of the fan 160 and flow out via the blade 163. An edge of the blade may be inclined outward and upward with respect to the axial direction so that outflowing air may flow upward in the radial direction.

An air guide 170 may be coupled to the fan 160 to guide a flow of the air passing through or discharged from the fan 160. The air guide 170 may be provided above the fan housing 150. As an example, the air guide 170 may have an outer diameter corresponding to an outer diameter of the fan housing 150 and may be stacked onto the fan housing 150 to guide the flow of the air from the fan 160.

The air guide 170 may include an outer wall 171 having a cylindrical shape and an inner wall 172 having a cylindrical shape located inside the outer wall 171. The outer wall 171 may surround the inner wall 172 and be spaced apart from the inner wall 172 such that a diameter of the outer wall 171 is greater than a diameter of the inner wall 172. The diameter of the outer wall 171 may define an outer diameter of the air guide 170, and the diameter of the inner wall 172 may define an inner diameter of the air guide 170. A first air passage 172a through which air flows may be formed between an inner circumferential surface of the outer wall 171 and an outer circumferential surface of the inner wall 172.

The air guide 170 may further include a motor receiving portion or container 173 extending downward from the inner wall 172 to receive the fan motor 165. The motor receiving portion 173 may have a bowl shape having a diameter that decreases in the downward direction. A motor coupler or fastener may be provided on a side of the fan motor 165, and the motor coupler may guide and fix the fan motor 165 to the air guide 170. The shape of the motor receiving portion 173 may correspond to a shape or inner contour of the hub 161 so that the motor receiving portion 173 may be inserted into the hub 161.

The fan motor 165 may be supported by an upper side of the motor receiving portion 173. The rotation shaft of the fan motor 165 may extend downward from the fan motor 165 and may be coupled to the shaft coupling portion of the hub 161 through an opening or hole formed in a bottom of the motor receiving portion 173.

The air guide 170 may further include a guide vane or rib 175 provided in the first air passage 172a. The guide vane 175 may extend from the outer circumferential surface of the inner wall 172 to the inner circumferential surface of the outer wall 171, and may extend upward in an oblique or inclined way from a lower portion of the outer wall 171 and the inner wall 172. The guide vanes 175 may be spaced apart from one another. The guide vanes 175 may add structural rigidity to the air guide 170.

The plurality of guide vanes 175 may function to guide the air introduced into the first air passage 172a from the fan 160 upward, and a shape or inclination of the guide vanes 175 may be configured to discharge air at a predetermined angle. For example, each guide vane 175 may be rounded or curved to guide the air to flow upward in the axial direction. An optional display may be provided at the top of the main air purifier 1.

Figure 6:
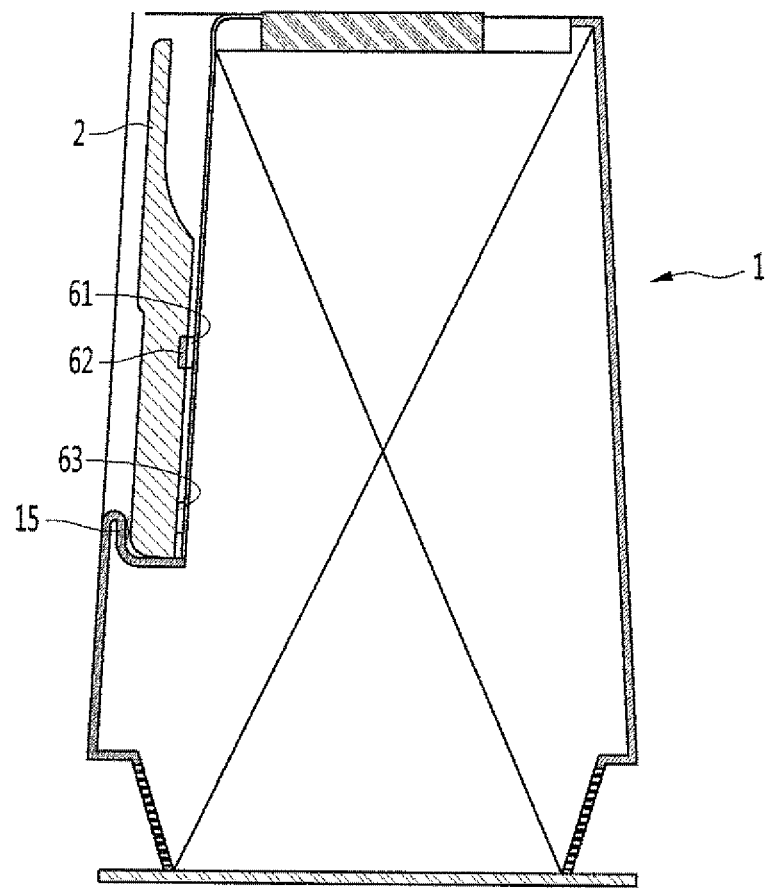
FIG. 6 is a sectional view taken along the line B-B' in FIG. 1.

Referring to FIG. 6, the mounting portion 15 may be formed on a front side of the outer surface of the main air purifier 1. The mounting portion 15 may extend in a longitudinal direction (i.e., vertical direction) down the case 101. The handheld air purifier 2 may be inserted into and seated on the mounting portion 15.

Referring to FIGS. 3 and 6, the suction body 31 of the handheld air purifier 2 may be placed in the mounting portion 15 so that the handle 32 extends upward. A bottom end of the mounting portion 15 may extend or curve upward to hold the suction body 31 in place. The mounting portion 15 may resemble a pocket. According to such a seating structure, a user may easily grasp the handle 32. However, embodiments disclosed herein are not limited to the seating structure shown in FIG. 6; for example, the mounting portion 15 may instead be a hook, and the handle 32 may be inserted into the hook and/or the suction body 31 may hang from the hook. As another example, the mounting portion 15 may be a recess or pocket configured to hold the handle 32 instead of the suction body 31.

Magnetic coupling may be used to further secure the handheld air purifier 2 to the main air purifier 1 during mounting. One of the handheld air purifier 2 and the main air purifier 1 may have a magnet, and the other of the handheld air purifier 2 and the main air purifier 1 may have a metal or a magnet having an opposite polarity. When the handheld air purifier 2 is mounted on the mounting portion 15, the magnets and/or the magnet and the metal may be aligned.

For example, a magnet 62 may be provided behind a front surface of the suction body 31 of the handheld air purifier 2. A magnet 61 having an opposite polarity of the magnet 62 may be provided at a position in the mounting portion 15 to align with the magnet 61 when the handheld air purifier 2 is seated in the mounting portion 15. The magnet 62 may be attached to the outer surface of the case 101, or alternatively behind the case 101 in an interior of the main air purifier 1. The magnets 61 and 62 may prevent the handheld air purifier 2 from tipping or falling over when seated on the mounting portion 15.

The mounting portion 16 may further include a mounting or seating sensor 63 to sense whether the handheld air purifier 2 is mounted on the main air purifier 1. The seating sensor 63 may be any sensor capable of detecting an approach of the handheld air purifier 2, for example, a weight sensor, a light sensor, a hall sensor, or a sensor to sense a change in an electrical or physical signal that may be altered by the seating of the handheld air purifier 2 such as reflected radio wave sensing, electrical shorting, mechanical switching, optical signal disconnection, etc. The seating sensor 63 may be placed at a position adjacent to where the handheld air purifier 2 is placed when mounted on the mounting portion 15.

An operation of the air purifying system may be based on a sensing by the seating sensor 63 on whether the handheld air purifier 2 is mounted or separated from the main air purifier 1. As an example, the handheld air purifier 2 may automatically stop operating once the seating sensor 63 senses that the handheld air purifier 2 is mounted on the mounting portion 15, and the handheld air purifier 2 may automatically start operating once the seating sensor 63 senses that the handheld air purifier 2 has been lifted and separated from the mounting portion 15.

The mounting portion 15 may be further provided with a charging module or portion to charge the handheld air purifier 2. For example, the handheld air purifier 2 may have a battery to operate the fan 35, which may be charged via a wireless power transfer (WPT) method. A position of the battery may not be limited and may be provided in the handle 32, the suction body 31, the bending portion 37, etc. The main air purifier 1 may optionally have a battery so that the main air purifier 1 may operate even if it is disconnected from an external power supply. As another example, the handheld air purifier 2 may alternatively be connected to the main air purifier 1 via a cable or wire.

The main air purifier 1 may have a wireless power transmitter or a wireless power transceiver that aligns with a wireless power receiver or a wireless power transceiver in the handheld air purifier 2 when the handheld air purifier 2 is mounted on the main air purifier 1. As an example, a wireless power transceiver may be located in the mounting portion 15 of the main air purifier 1, and a wireless power transceiver may be located in the suction body 31 of the handheld air purifier 2.

In addition, an ultraviolet sterilizing portion capable of disinfecting the suction surface 33 may be provided in the mounting portion 15. The ultraviolet sterilizing portion may be an ultraviolet light emitting device in the light 38 of the mounting portion 15, or alternatively may be a separate light device.

Figure 7:
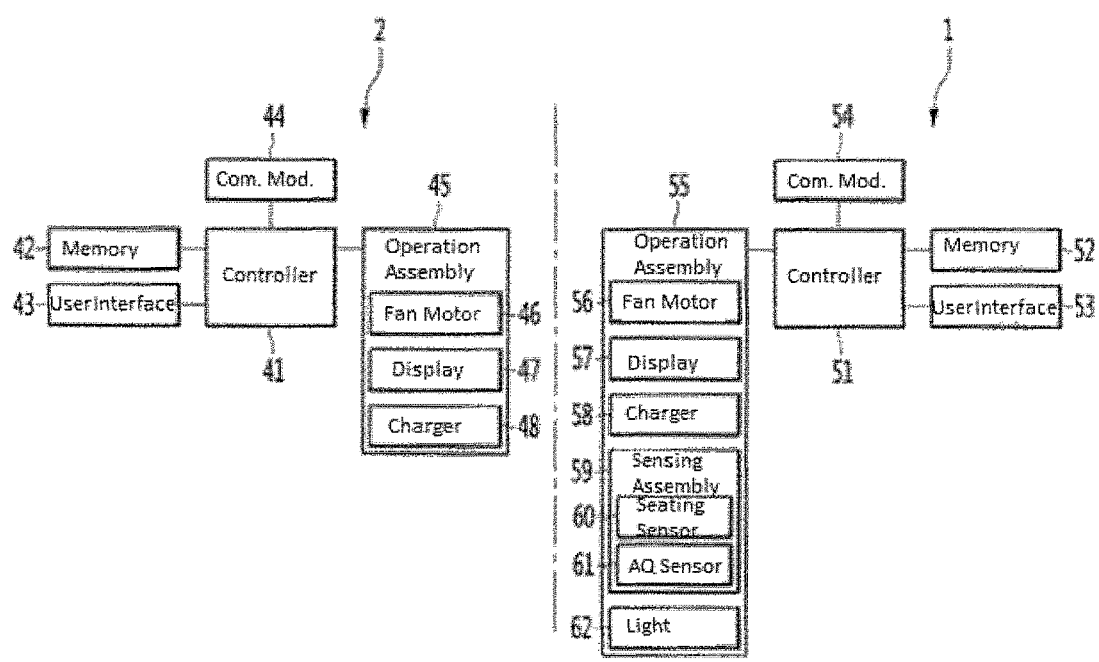
FIG. 7 is a block diagram of an air purifying system.

Referring to FIG. 7, a configuration of the air purifying system may be similar to that already described with reference to FIGS. 1-6, but different reference numbers may be given for the sake of precise description. For example, the fan 35 of the handheld air purifier 2 in FIG. 3 may be included in a fan drive device 46 in FIG. 7, which may also include a power supply device to operate the fan 35.

The air purifying system may include a main air purifier 1 and a handheld air purifier 2, which may be freely attachable to and detachable from the main air purifier 1. The main air purifier 1 may be provided with a controller 51 to control the main air purifier 1, a driving or operation assembly 55, a memory 52 to store various information necessary for operation, a communication module 54 to communicate with the handheld air purifier 2 and/or to obtain external data, and a user interface or operation device 53 into which operation information may be input. The main air purifier 1 may connect to a power supply to supply power for operation. The controller 51 may control the memory 52, communication module 54, and the operation assembly 55 based on information received by the communication module 54, information stored in the memory 52, measurements taken by a sensing assembly 59, or commands input into the user interface 53.

The operation assembly 55 may include a display 57 to display operation information and indoor environment information of the main air purifier 1, a fan driving device 56 to suction outside air to perform air purifying, a charging device 58 (e.g., wireless power transmitter or transceiver), a sensing assembly 59 to sense external or environmental conditions and a mounting of the handheld air purifier 2, and a lighting device 62 to emit light. The sensing assembly 59 may include a seating sensor 60 to detect a mounting and dismounting of the handheld air purifier 2 and a dust or air quality sensor 61 to sense a degree of pollution or contamination of an indoor environment in which the main air purifier 1 is placed. The charging device 58 may charge a charging device 48 (e.g., wireless power receiver or transceiver) of the handheld air purifier 2.

The communication module 54 connected to the controller 51 may be connected to an external device (e.g., a server) to perform communication. The communication module 54 may implement wireless communication and may be, e.g., a BlueTooth or WiFi module, or alternatively may use a wired communication. The communication module 54 may communicate with a communication module 44 ("com. mod. in FIG. 7") of the handheld air purifier 2 to exchange data (e.g., air quality data, operation status, or location data). The communication module 54 may also communicate with a fixed or portable internet of things (IOT) device that sense air quality or another external air quality sensor. The communication module 54 may optionally receive data from an external application or data source, for example, air quality or weather forecast information stored online, and may be able to transmit data to a mobile or web application.

The handheld air purifier 2 may include a controller 41 to control the handheld air purifier 2, a driving or operation assembly 45, a memory 42 to store various information necessary for operation, a communication module 44 to communicate with the main air purifier 1 and/or to obtain external data, and a user interface or operation device 43 into which operation information may be input. The controller 41 may control the memory 42, communication module 44, and the operation assembly 45 based on information (e.g., mounting information or air quality information measured by the sensor assembly 59) received by the communication module 44, information stored in the memory 42, commands input into the user interface 43, charging information, or measurements taken by an optional sensing assembly.

The operation assembly 45 may include a fan driving device 46 to suction outside air to perform air purifying, a display 47 that displays operation information, charging information, and indoor environment information of the handheld air purifier 2, and the charging device 48 to charge a battery. The communication module 44 may be similar to the communication module 54 of the main air purifier 1 and may connect to the communication module 54 and/or an external device (e.g., a server) to perform communication. The communication module 44 may implement wireless communication and may be, e.g., a BlueTooth or WiFi module, or alternatively may use a wired communication. The communication module 44 may exchange data (e.g., air quality data, operation status, or location data) with the communication module 54 of the main air purifier 1. The communication module 44 may also communicate with a fixed or portable IOT device 202 or 203 (FIGS. 12 and 13) that sense air quality or another external air quality sensor. The communication module 54 may optionally receive data from an external application or data source, for example, air quality or weather forecast information stored online, and may be able to transmit data to a mobile or web application.

Operations of the main air purifier 1 and handheld air purifier 2 may be controlled by the controllers 51 and 41, respectively, based on operation status data exchanged via the communication modules 54 and 44. The handheld air purifier 2 may be charged by a connection between the charging devices 48 and 58 when the seating sensor 60 indicates that the handheld air purifier 2 is mounted on the main air purifier 1.

When the seating sensor 60 indicates that the handheld air purifier 2 is separated from the main air purifier 1, the seating sensor 60 may transmit a predetermined or separation signal to the controller 51 of the main air purifier 1. Upon receiving the predetermined signal, the controller 51 of the main air purifier 1 may change a control state of the air purifying system. For example, the air purifying system may operate in a "mounted state" when the handheld air purifier 2 is mounted on the main air purifier 1 and a "separated state" when the handheld air purifier 2 is separated from the main air purifier 2 (i.e., when the controller receives the predetermined signal). For example, in the separated state, the light device 62 may be turned on, and/or an ultraviolet light optionally included in the light device 62 may be turned off.

In the "mounted state," the fan driving device 46 of the handheld air purifier 2 may not be operated while the fan driving device 56 of the main air purifier 1 may be operated. In the "separated state," the fan driving device 46 of the handheld air purifier 2 may be operated, along with the fan driving device 56 of the main air purifier 1 so that any scattered dust may be suctioned. The handheld air purifier 2 may not provide as high or strong of a filtration performance as the main air purifier 1 due to a narrow internal space of the suction body 31, and some fine dust may not be suctioned through the suction portion 33 and instead escape to a periphery of the handheld air purifier 2 during a sweeping motion on a targeted surface. The main air purifier 1 may suction fine dust not suctioned by the handheld air purifier 2.

An operation of the fan driving device 56 of the main air purifier 1 may be synchronized with an operation of the fan driving device 46 of the handheld air purifier 2. For example, speeds of the fans in the fan driving devices 56 and 46 may change based on a mounting status of the handheld air purifier 2, based on air quality information acquired from the air quality or AQ sensor 61 or based on data from the IOT devices, or other conditions. Various control methods of the air purifying system will be described below.

Figure 8:
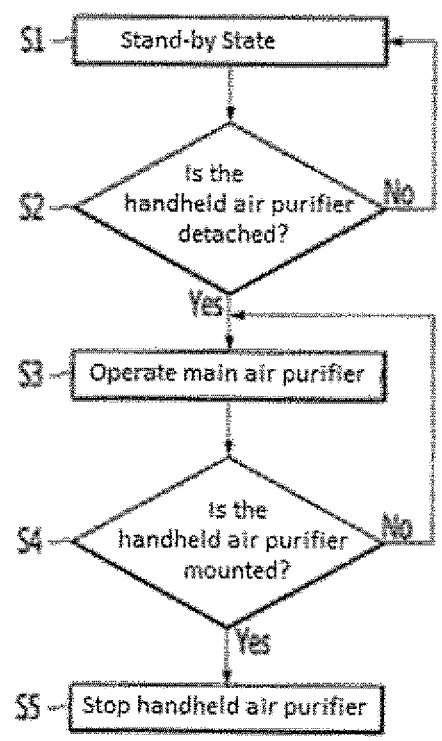
FIG. 8 is a flow chart illustrating a control method of the air purifying system.

Referring to FIGS. 7-8, the handheld air purifier 2 may be seated on the main air purifier 1, and an interlocking operation between the handheld air purifier 2 and the main air purifier 1 may be in a stand-by state (S1). In the standby state, the main air purifier 1 may be operating or not operating. The seat sensor 60 may periodically sense whether the handheld air purifier 2 is separated from the main air purifier 1 (S2).

If the handheld air purifier 2 is detached thereafter ("Yes"), the seat sensor 60 may indicate, via a separation signal, that the handheld air purifier 2 is not mounted to the main air purifier 1 (S2). The controller 51 of the main air purifier 1 may operate the operation assembly 55 based on the separation signal (S3).

As an example of a type of operation that may occur during S3, the main air purifier 1 and the handheld air purifier 2 may be turned on to operate together. The handheld air purifier 2 may suction rather than blow air containing dust. Scattering dust may be eliminated, and dust diffused into an indoor space may be reduced. However, despite the suction method implemented by the handheld air purifier 2, some dust may diffuse to its periphery due to a weaker suction strength and/or lower air cleaning capacity of the handheld air purifier 2. If a user sweeps the handheld air purifier 2 back and forth across a targeted surface (e.g., clothing), some finer dust may simply fall off the clothing to contaminate a floor, the indoor air, and surroundings. Such errant dust may be suctioned and filtered instead by the main air purifier 1, and scattering dust in may be further reduced. A synchronized or interlocking operation between the handheld air purifier 2 and the main air purifier 1 may be automatic without prompting by a user's command. Such automatic interlocking operation may improve cleanliness and comfort of an indoor environment and convenience of the air purifying system.

The seating sensor 60 may periodically sense whether the handheld air purifier 2 has mounted back onto the main air purifier 1 (S4). If the handheld air purifier 2 has not been mounted ("No"), then interlocked operation of the handheld air purifier 2 may resume. If the seating sensor 60 indicates that the handheld air purifier 2 has been mounted on the main air purifier 1 ("Yes"), then an operation of the handheld air purifier 2 may be stopped (S5). The main air purifier 1 may continue to operate to suction dust from the suction surface 33 of the handheld air purifier 2. Alternatively or in addition thereto, an operation of the main air purifier 1 may be stopped.

Figure 9:
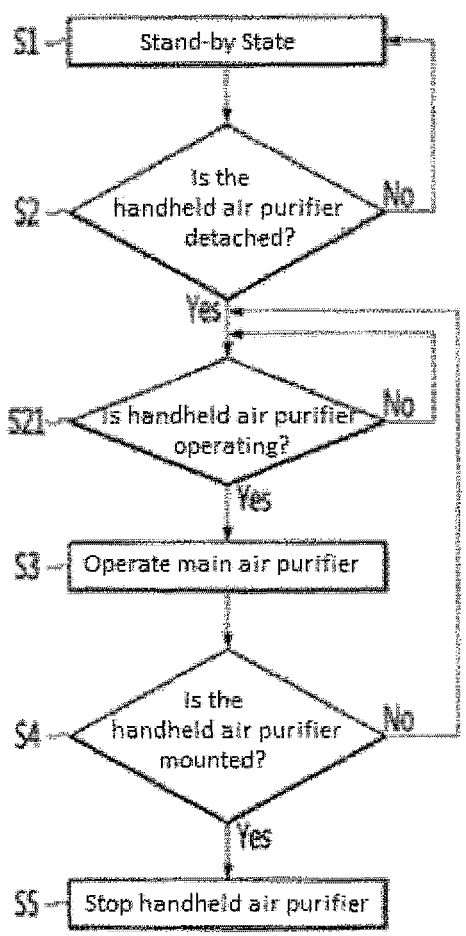
FIG. 9 is a flowchart illustrating a control method of an air purifying system according to another embodiment.

A control method shown in FIG. 9 may be the same as that of FIG. 8, and may differ only in an operation of the main air purifier 1. Referring to FIG. 9, the main air purifier 1 may not start simultaneously with the handheld air purifier 2 and may instead start at a time after.

S1 may be the same standby step as in FIG. 8. S2 may be the same sensing step as in FIG. 8. If the seating sensor 60 indicates that the handheld air purifier 2 is separated from the main air purifier 1 ("Yes"), the handheld air purifier 2 may be operated, but the main air purifier 1 may remain off or turn off it was previously operating (S21).

During S21, an operation status of the handheld air purifier 2 may be periodically transmitted to the main air purifier 1 via the communication modules 44 and 54. If the handheld air purifier 2 has not been started (either automatically or, alternatively, manually by a user), the operation status of the handheld air purifier 2 may continue to be exchanged. Once the handheld air purifier 2 has started ("Yes"), the main air purifier 1 may be operated in step S3. Such a delayed operation of the main air purifier 1 may reduce unnecessary power consumption. S4 and S5 may be the same sensing and stopping steps as in FIG. 8, respectively.

Figure 10:
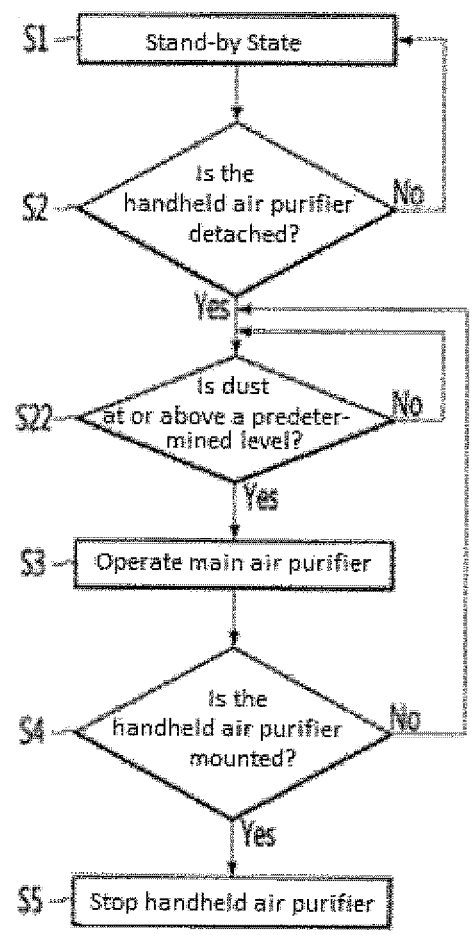
FIG. 10 is a flow chart illustrating a control method of an air purifying system according to yet another embodiment.

A control method shown in FIG. 10 may be the same as that of FIGS. 8 and 9, and may differ only in an operation of the main air purifier 1. Referring to FIG. 10, the main air purifier 1 may be not operated immediately even if the handheld air purifier 2 is detached or started. Instead, the main air purifier 1 may wait to operate until dust is detected by the air quality sensor 61.

S1 may be the same standby step as in FIGS. 8 and 9. S2 may be the same sensing step as in FIGS. 8 and 9. If the seating sensor 60 indicates that the handheld air purifier 2 is separated from the main air purifier 1 ("Yes"), the handheld air purifier 2 may be operated, but the main air purifier 1 may remain off or turn off it was previously operating (S22).

During S22, a pollution or contamination level of an indoor space may be periodically measured by the dust sensor 61 and transmitted to the main air purifier 1. If the dust sensor 61 does not sense dust and/or measures the contamination level to be below a predetermined contamination level, the contamination level may continue to be measured and exchanged. Once the dust sensor 61 indicates that the contamination level is at or above the predetermined contamination level ("Yes"), the main air purifier 1 may be operated in step S3. S22 may optionally measure and transmit an operation status of the handheld air purifier 2, and proceeding to step S3 may optionally require that the handheld air purifier 2 is operating, in addition to dust being detected at or above the predetermined contamination level. Such a delayed operation of the main air purifier 1 may reduce unnecessary power consumption. S4 and S5 may be the same sensing and stopping steps as in FIGS. 8 and 9, respectively.

Figure 11:
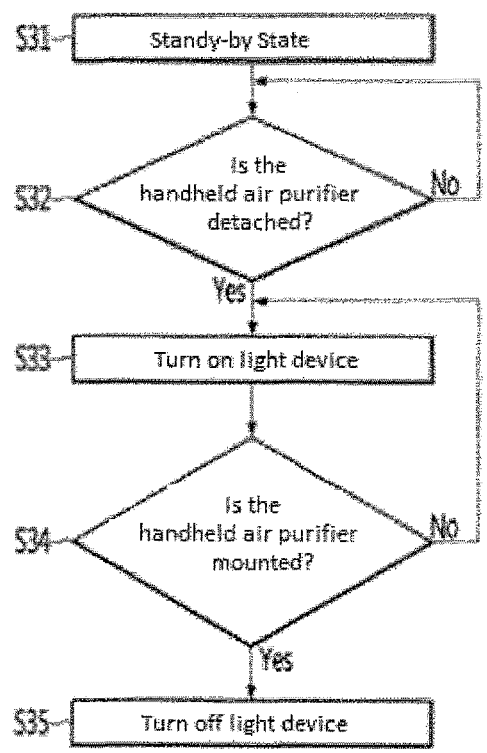
FIG. 11 is a flowchart illustrating a control method of an air purifying system according to yet another embodiment.

Referring to FIGS. 7 and 11, a control method shown in FIG. 11 focuses on an operation of the light device 62 of the main air purifier 1. The control method shown in FIG. 11 may be combined with any of the control methods of the air purifying system shown in FIGS. 8-10.

The first two steps S31 and S32 may be similar to the standby steps and mounting sensing steps of FIGS. 8-10. The handheld air purifier 2 may be mounted on the main air purifier 1, and an interlocking operation between the handheld air purifier 2 and the main air purifier 1 may be in a standby state (S31). In the standby state, the main air purifier 1 may be operating or turned off. The seating sensor 60 may periodically sense whether the handheld air purifier 2 has been separated from the main air purifier 1 (S32). If the handheld air purifier 2 has not been separated ("No"), the standby state S31 and sensing S32 may resume.

If the handheld air purifier 2 has been separated ("Yes"), the seating sensor 60 may send a separation signal to the controller 51. The controller 51 may control the light device 62 to turn on based on the separation signal (S33). The light device 62 may illuminate an area near the main air purifier 1 in which a garment to be treated by the handheld air purifier 2 may be placed. The user may conveniently remove dust from the garment using illumination from the light device 62. Alternatively or in addition thereto, the handheld air purifier 2 may have a light device that is turned on upon separation from the main air purifier 1. Such an alternative light device may be on a same side of the handle 32 and/or suction body 32 that the suction surface 33 is provided so that the light device may emit light toward the garment during treatment.

The light device 62 may correspond to the light 38 as shown in FIG. 2. Since the light device 62 may turn on once the handheld air purifier 2 is separated and since such light emitted from the light device 62 may be more visible when the handheld air purifier 2 is separated, the light device 62 may serve to inform a user of a separation of the handheld air purifier 2.

The light device 62 may be provided close to the mounting portion 15 of the main air purifier 1. The user may apply the suction surface 33 of the handheld air purifier 2 along an outer surface of the garment on which light from the light device 62 may be shined, and the main air purifier 1 may quickly suction scattered dust that is not suctioned by the handheld air purifier 2, improving convenience and accuracy.

The light device 62 may be close to a suction portion of the main air purifier 1. The user may be encouraged, by the light emitted by the light device 62, to remove dust from clothes in the vicinity of the main air purifier 1. Accordingly, a position of the main air purifier 1 and a dusty garment may be close so that the main air purifier 1 may suction dust that may not be filtered and instead scattered by the handheld air purifier 2. As a result, a floor and indoor space around the air purifying system may be cleaner. Since a suction portion (e.g., suction portion 103) of the main air purifier 1 may be provided toward a bottom portion of the main air purifier 1, falling dust may be suctioned through and filtered in the main air purifier 1.

The seating sensor 60 may periodically sense whether the handheld air purifier 2 is mounted back on the main air purifier 1 (S34). If the seating sensor 60 does not sense that the handheld air purifier 2 is mounted on the main air purifier 1 ("No"), the light device 62 may continue to emit light in step S33. If the seating sensor 60 senses that the handheld air purifier 2 is mounted on the main air purifier 1 ("Yes"), the illumination device 62 may be turned off (S35). The main air purifier 1 may continue to operate to suction dust from the suction surface 33 of the handheld air purifier 2. Alternatively or in addition thereto, the main air purifier 1 may be turned off, along with the handheld air purifier 2.

Alternatively, an operation of the handheld air purifier 2 and the illumination device 62 may be linked. When the handheld air purifier 2 is turned on (either manually or in accordance with any of the control methods shown in FIGS. 8-10), its "on" status may be communicated to the controller 51 of the main air purifier 1 via the communication modules 44 and 54, and the light device 62 may be turned on. When the handheld air purifier 2 is turned off, the light device 62 may be turned off.

Figure 12:
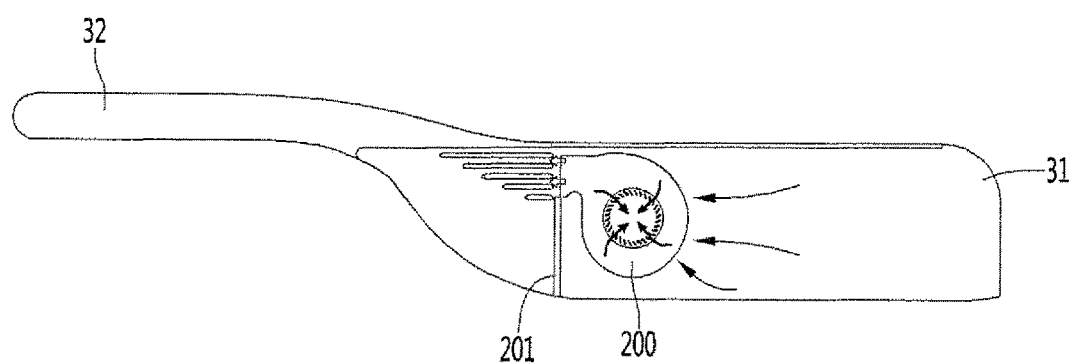
FIG. 12 shows a flow of air in the handheld air purifier.

Referring to FIG. 12, an action and configuration of the handheld air purifier 2 will be described in more detail. The handheld air purifier 2 may be a device carried by a user and may be used to target various surfaces (e.g., clothes or garments). The handheld air purifier 2 may be used in direct contact during treatment of the surfaces. The handheld air purifier 2 may be configured to operate according to a type of fabric. Airflow through a high-density fabric such as a smooth leather product may be difficult, while airflow through lower density fabrics such as knit or cotton products may be easier and/or faster. An operation of the handheld air purifier 2 may be based on an airflow through a fabric to be treated so as not to overload a motor of the fan 200 (35 in FIG. 3).

As previously described, the handle 32 may curve from the suction body 31 to be positioned above the suction body 31. While the suction member 31 may directly touch dusty clothes, a user's hand gripping the handle 32 may not touch dusty clothes, reducing an amount of dust that may adhere to the user's hand.

Since the handheld air purifier 2 may be small enough to be carried by a user, a fan motor may also have a smaller size and a smaller air cleaning capacity. A load of the motor may be appropriately controlled so as to prevent failure of the fan motor and to also reduce noise, since the handheld air purifier 2 may be carried by the user out and about.

The fan 200 of the handheld air purifier 2 may be a sirocco fan 200, but embodiments disclosed are not limited hereto, and alternatives are discussed in the next paragraph. For convenience of description, the fan 200 of FIG. 12 will be referred to as a sirocco fan. The sirocco fan 200 may also be called a multi-bladed fan. The sirocco fan 200 may be placed at or adjacent to the discharge port 36 in the suction body 31 or the bending portion 37. As an example, an outtake of the sirocco fan 200 may align or be provided under the discharge port 36, while an intake of the sirocco fan 200 may face or be adjacent to an area of the fan adjacent to the suction surface 33.

As an alternative to the sirocco fan 200, an axial fan may be provided. However, an axial fan may be large in size and suited to a wide installation area, and may be less suitable for a handheld or portable air purifier. In addition, the axial fan may produce more noise than a sirocco fan.

As another alternative, a turbo fan may be provided. However, a turbo fan may be difficult to implement in a narrow space due to difficulties in designing or configuring an airflow direction. The turbo fan may suction air in an axial direction of the motor and discharge air in a radial direction. The axial direction of the turbo fan motor may be installed in a longitudinal direction of the handheld air purifier 2. However, as a size of the handheld air purifier 2 or the turbo fan increases, a likelihood of turbulence and noise generated from the discharged air also increases.

Many types of other fans may be used in place of the sirocco fan 200, but may be more difficult to apply than the above-mentioned axial flow fan and turbo fan. The sirocco fan 200 may be advantageous in that it may reduce noise while having a larger air cleaning capacity than other fans of a same or similar size.

Air may be suctioned from a relatively wide suction surface 33 (FIGS. 3 and 13), which may be extend in the longitudinal direction of the handheld air purifier 2. Suctioned air may be blown toward the discharge port 36. A shut-off membrane 201 may be provided on a discharge side of the sirocco fan 200 so that air discharged from the sirocco fan 200 may not be blown or suctioned backward toward the suction surface 33 and/or a suction side of the sirocco fan 200, and instead may be discharged through the discharge port 36.

The suction side of the sirocco fan 200 may be opened or hollow in a width direction of the suction body 31 and may suction air in a wider area. The air may be suctioned from suction ports of the sirocco fan 200, and a larger capacity of air may be suctioned. As described above, air introduced from the suction body 31 may flow into a suction side and suction port of the wide sirocco fan 200, which may be operated with low noise. The blades of the sirocco fan may be configured to be quiet, and noise may be further reduced.

The discharge side of the sirocco fan 200 may be aligned under the discharge port 36, and discharged air may be guided to the discharge port 36 directly. A large volume of air may be initially discharged to have a similar flow rate, and a size of an interior space of the handheld air purifier 2 may be reduced away from the discharge port 36, reducing an overall size of the handheld air purifier 2.

Figure 13:
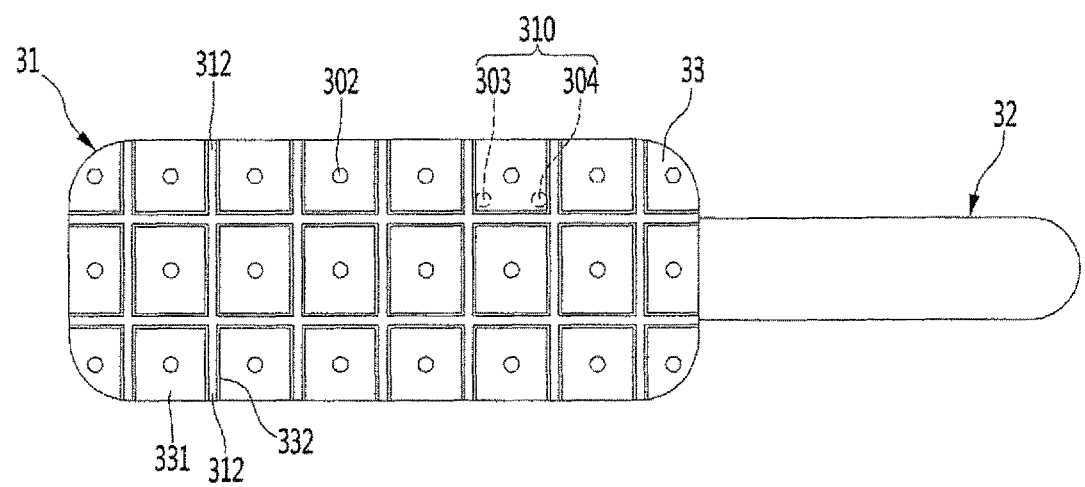
FIG. 13 show a bottom or front view of the handheld air purifier.
Figure 14:
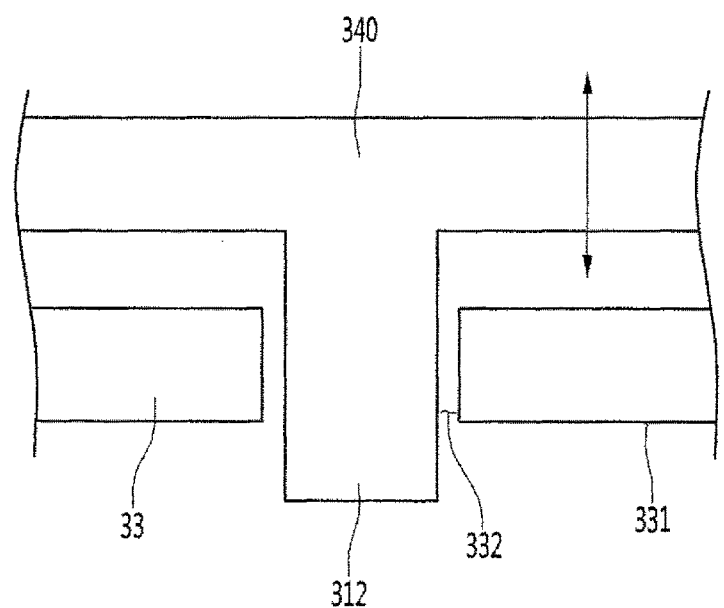
FIG. 14 is a cross-sectional cut view of a suction surface of the handheld air purifier.

Referring to FIGS. 13 and 14, the suction surface 33 may be provided in two layers. The two layers of the suction surface 33 may include a first suction surface or layer 331 and a second suction surface or layer 340. The first suction surface 331 may also be referred to as a lower (with respect to FIG. 14) or front suction surface or layer, and may face a garment during use. The second suction surface 340 may also be referred to as an upper (with respect to FIG. 14) or rear suction surface or layer. The first suction surface 331 and the second suction surface 340 may guide a suction flow of air smoothly, and may have frame structures. Therefore, the first and second suction surfaces 331 and 340 may also be referred to as first and second frames.

The first suction surface 331 may have at least one slit or opening 332 on a lower or front side and suction outside or ambient air. There may be a plurality of openings 332 formed in the first suction surface 331. Portions of the first suction surface 331 may extend across the slits 332 so that the first suction surface 331 may be one piece. The second suction surface 340 may have protrusions 312 passing through the slits 332 of the first suction surface 331 to protrude frontward (or downward) past the first suction surface 331.

The slit 332 may be an opening facing a first direction (a frontward-backward direction or, with respect to FIG. 14, a vertical direction), and the protrusion 312 may extend and be inserted in the first direction. Dust may be removed more quickly via the protrusions 312 when the user grasps the handle 32 of the handheld air purifier 2 and sweeps dust off the garment. The protrusions 312 may serve as bristles that help sweep loose dust off of the garment.

The slits 332 may have line segment shapes extending in second and third directions (i.e., lateral directions along the first suction surface 331). The second and third directions may be perpendicular to each other and to the first direction. The protrusions 312 may be walls formed in a grid shape or line segment shapes formed along second and third directions and also extended downward in the first direction to insert into the slits 332.

The second suction surface 340 and/or the protrusion 312 may be moved in the first direction (i.e., up and down) by an up and down movement structure. The up and down movement structure may move via a motor, or alternatively by a flow of air suctioned through the slit 332. Details of how the movement device will be described with reference to FIG. 15. The protrusion 312 may pass through the slit 332 downward toward the garment, and may be moved away from the garment.

When an end of the protrusion 312 is further lowered past the slit 332, the end of the protrusion 312 may push onto the garment and a space or gap may be formed between the first suction surface 331 and the garment so that air may flow more smoothly into an interior of the handheld air purifier 2. Such a gap may be useful when the handheld air purifier is used on high-density fabrics such as leather products, etc. where air flow through a surface of the garment may be difficult.

When the end of the protrusion 312 is pulled upward and inserted back into the slit 332, the first suction surface 331 may directly contact the garment, reducing or eliminating the gap between the first suction surface 331 and the garment. Such direct contact may be useful when the handheld air purifier 2 is used to treat low density fabrics, such as knitted fabric. Since the protrusions 312 may not protrude beyond the slits 332, air and foreign matter may be suctioned more smoothly.

An optical sensor 310 may be provided on the first suction surface 331 at a place adjacent to the slit 332 through which suctioned air flows. The optical sensor 310 may include a light emitting device 303 (e.g., a light emitting diode or LED) to emit light and a light receiving device 304 to receive light emitted from the light emitting device 303 and reflected by the garment. An amount of foreign matter such as dust contained in the air may be detected or determined based on an amount of light received by the light receiving device 304.

A driving speed of the fan motor of the fan 200 (FIG. 12) may be controlled in accordance with a determined amount of foreign matter. For example, if a determined amount of foreign matter is greater than or equal to a predetermined dust amount, the driving speed of the fan motor may be automatically adjusted to a predetermined high speed. As another example, the driving speed of the fan motor may be continuously adjusted in proportion to an amount of foreign matter determined or detected. As an amount of foreign matter increases, the driving speed of the fan motor may also be increased.

A plurality of holes 302 may be formed in the first suction surface 331. Air may be suctioned through the holes 302 in addition to the slits 332. Outside air may always be introduced through the holes 302.

There may be two paths through which air may be suctioned through the first suction surface 331: through the slit 332 and through the hole 302. Overload of the fan motor may be prevented since there may be multiple paths through which air may be suctioned.

Figure 15:
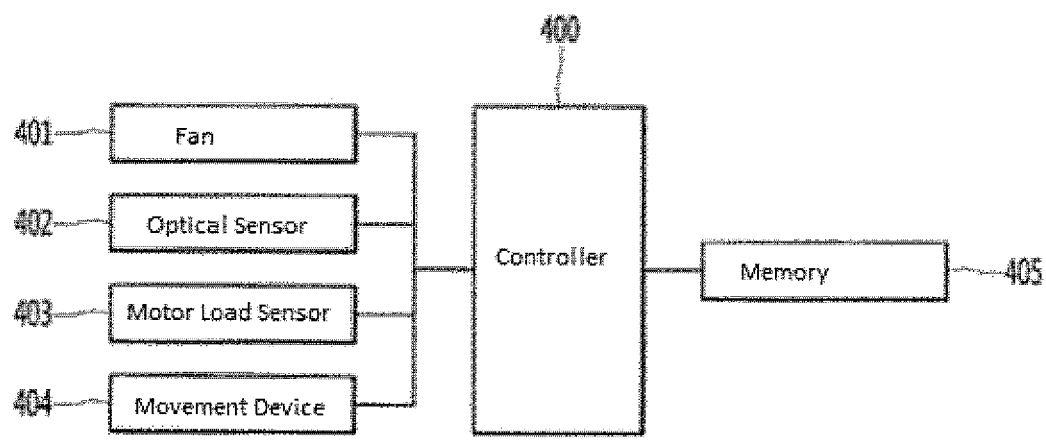
FIG. 15 is a block diagram explaining an operation of the handheld air purifier according to an embodiment.

FIG. 15 is a block diagram explaining an operation of the handheld air purifier 2 according to an embodiment. New reference numbers may be designated to previously described components. For example, although the fan may have been designated as 35 and 200, the fan will be designated as 401 in the description for FIG. 15.

Referring to FIG. 15, a controller 400 may be provided to control an overall operation of the handheld air purifier 2, and a memory 405 may be provided to store information necessary for an operation of the controller 400. A driving assembly driven under control of the controller 400 may include a fan 401 having a motor to generate an air flow of the handheld air purifier 2, an optical sensor 402 to detect an amount of foreign substances such as dust, a motor load sensor 403 to detect a load on the fan motor of the fan 401, and a movement device 404 to control an up and down movement of the second suction surface 340.

The fan 401 may be a sirocco fan and the motor may be a motor configured to drive a sirocco fan. The optical sensor 402 may have a sensor structure provided as a pair of a light emitting portion or device and a light receiving portion or device. The optical sensor 402 may alternatively be implemented as sensors other than light sensors.

The motor load sensor 403 may be configured to sense or measure a rotational speed of the fan motor relative to an input power of the motor. However, embodiments disclosed herein are not limited, and the motor load sensor 403 may alternatively be configured to sense or measure a calorific value or energy input of the fan motor, or a counter electromotive force of the fan motor.

The movement device 404 may also be referred to as a second suction surface mover or controller. The movement device 404 may have a rack, pinion, and motor structure and may move the second suction surface up and down under the control of the controller 400. However, embodiments disclosed herein are not limited to such a structure of the movement device 404. For example, the movement device 404 may be implemented as a hydraulic or pneumatic motor or a linear actuator. As another example, the movement device 404 may be an elastic device that contracts to pull the second suction surface inward. A lock may maintain the elastic device in a contracted position, and the elastic device may be released to push the second suction surface outward.

Referring to FIGS. 14-15, when an operation of the handheld air purifier 2 is started, the handheld air purifier 2 may be operated by a user's selection or at a predetermined driving speed of the fan motor 401 and at a predetermined height of the second suction surface 340. The handheld air purifier 2 may include a user interface (e.g., a button, dial, touchscreen, slider, etc. in the handle 32) through which a user may input commands.

Thereafter, an amount of foreign matter may be detected by the optical sensor 402, and the driving speed of the fan motor of the fan 401 may be automatically adjusted based on a degree of foreign matter detected. The handheld air purifier 2 may therefore be automatically operated according to an amount of dust detected.

If there is a large amount of foreign matter (e.g., an amount greater than or equal to a predetermined high dust amount or level), the driving speed of the fan motor of the fan 401 may be increased (e.g., to a predetermined high fan speed), so that foreign matter of the clothes may be suctioned in quickly and efficiently. A strong air flow rate may be used to rapidly suction foreign matter into the handheld air purifier 2 from a peripheral side, where dust from clothes may be scattered. Accordingly, dust scattering to a periphery of the handheld air purifier 2 may be reduced by a stronger suction rate, although noise may be increased.

If there is less foreign material, the operation described above may be reversed. When a small amount of foreign matter (e.g., an amount less than or equal to a predetermined low dust amount or level), the driving speed of the fan motor of the fan 401 may be decreased (e.g., to a predetermined low fan speed), so that foreign matter of the clothes may be suctioned in quietly.

A control of the driving speed of the fan motor of the fan 401 may be based on steps (e.g., first, second, third, etc. predetermined fan speeds that are activated upon detecting corresponding first, second, third, etc. predetermined dust amounts), or may be continuously adjusted in proportion to a detected dust level. As more dust is suctioned and a detected foreign matter amount decreases, the driving speed of the fan motor of the fan 401 may also decrease, and noise and power consumption may be gradually reduced as more dust is suctioned.

While the operation of the handheld air purifier 2 may be progress based on the amount of dust, a type of clothes may be determined by using the motor load sensor 403. A movement of the movement device 404 may be controlled based a measurement by the motor load sensor 403.

When the garment may be made of a higher-density fabric (e.g., leather), a resistance to air flow may be great as the first suction surface 331 contacts the garment. The load of the fan motor detected by the motor load sensor 403 may be large (e.g., greater than or equal to a predetermined large load amount), and the movement device 404 may be controlled so that the protrusion 312 is moved downward (e.g., to a predetermined downward position or by a predetermined downward distance). The protrusion 312 may push the garment and create a space or gap between the garment and the first suction surface 331 to reduce the resistance to air flow and reduce the load of the fan motor of the fan 401.

When the garment may be made of a higher-density fabric (e.g., leather), a resistance to air flow may be great as the first suction surface 331 contacts the garment. The load of the fan motor detected by the motor load sensor 403 may be large (e.g., greater than or equal to a predetermined large load amount), and the movement device 404 may be controlled so that the protrusion 312 is moved downward (e.g., to a predetermined downward position or by a predetermined downward distance). The protrusion 312 may push the garment and create a space or gap between the garment and the first suction surface 331 to reduce the resistance to air flow and reduce the load of the fan motor of the fan 401.

When the garment may be made of a lower-density fabric (e.g., a knitted fabric), a resistance to air flow may be less. The load of the fan motor detected by the motor load sensor 403 may be small (e.g., less than or equal to a predetermined small load amount), and the movement device 404 may be controlled so that the protrusion 312 is moved upward (e.g., to a predetermined upward position or by a predetermined upward distance). Air may be suctioned more smoothly and dust may be more efficiently suctioned from clothes, as the first suction surface 331 may be closer to the garment.

A control of the vertical movement of the movement device 401 may be based on steps (e.g., first, second, third, etc. predetermined positions or distances that are activated upon detecting corresponding first, second, third, etc. predetermined load amounts), or may be continuously adjusted in proportion to a detected load level. As the load of the fan motor decreases, the movement device 404 may move the second suction surface 340 and the protrusion 312 further upward to decrease a gap size between the first suction surface 331 and the garment. As the load of the fan motor increases, the movement device 404 may move the second suction surface 340 and the protrusion 312 further downward to increase a gap size between the first suction surface 331 and the garment. The handheld air purifier 2 may therefore be automatically operated based on a material of a surface that is treated.

This application is related to co-pending U.S. application Ser. Nos. 16/821,087 filed on Mar. 17, 2020 and Ser. No. 16/821,124 filed on Mar. 17, 2020, the entire contents of which are hereby incorporated by reference.

Embodiments disclosed herein may provide a main air cleaner or purifier in a fixed position and a movable body or handheld air cleaner or purifier which may be freely attachable to and freely detachable from the main air cleaner, and may be freely applicable to clothes. Not only may the two devices be used individually, but dust cleaning of clothes may be performed with higher efficiency by mutual cooperation of the two devices. A user may use the handheld air cleaner more conveniently and safely.

Embodiments disclosed herein may provide an air purifier or cleaner and an air cleaning or purifying system which may prevent scattering of dust removed from clothes, thereby reducing indoor pollution. The air purifier and air purifying system may reduce a likelihood of fugitive or errant dust from being breathed in by a user when a user treats his garments to remove foreign matter.

Embodiments disclosed herein may provide an air purifier or cleaner and an air purifying or cleaning system that may reduce energy consumption. The air purifier and air purifying system may be conveniently and safely used by a user.

Embodiments disclosed herein may be implemented as an air purifier (e.g., a handheld air purifier) including a suction body having a fan motor and a filter therein for suctioning and filtering air from a lower surface, and a handle that extends rearward from the suction body and is held by a user. Dust on clothes may be sucked instead of scattered. Due to a bending of the handle, the user's hand may not touch the dusty garment during treatment.

The lower surface of the air purifier may have a flat shape so that a large amount of air can be suctioned from a surface of a garment (e.g., fabric surface). A height of the suction body may be smaller than a width of the suction body so that the suction body may have a wide suction face or surface. A width of the suction member may be smaller than a length of the suction member and larger foreign substances may be removed by a user's hand sweeping movement.

A bent or curved portion may be bent upward to connect the suction body and the handle, and dust may be prevented from being in direct contact with a hand holding the handle. A discharge port may be provided in the bent portion through which air is discharged so as to avoid blowing air toward a garment being treated by the suction body and scattering dust away from the air purifier.

At least a part of the fan and/or a fan motor may be provided at a boundary between the suction body and the discharge port so that a wide suction area may be utilized. The fan may be provided as a sirocco fan and may absorb a large volume of air with low noise. A narrow inner space of the suction body may be utilized. A suction port of the sirocco fan may be opened in a width direction of the suction body, and air may be suctioned into a wide space in both directions, and a width of the wide suction body may be actively utilized. A discharging side of the sirocco fan may be aligned with the discharging port provided in the bent portion to reduce a flow resistance of the air. A battery may be included in the handle, as the battery may be heavy and the air purifier may be easier to handle if more weight is provided in the handle.

The air purifier may have a lower or first suction surface and a second suction surface having a protrusion extending downward above the first suction surface. Accordingly, a suction flow path of the suction body may be adjusted to maintain an optimum suction efficiency at all times in accordance with a kind of cloth or fabric. The second suction surface may be moved up and down, and a suction efficiency may be controlled in a same manner with respect to the entire suction surface.

At least two slits may be provided in which the suction surface is long and open, and projections on the suction surface may vertically move up and down through the slit so that a structure of a suction path is simple, and a degree of control of the path may be increased. A sensor to measure an amount of foreign matter or dust introduced into the suction body may be included so that the air purifier may be operated based on a contamination state of the clothes.

Embodiments disclosed herein may be implemented as an air purifier comprising a suction body having a fan, a fan motor, and a filter, a first suction surface located at a lowest side of the suction body to suction outside air, and a motor load sensor to measure a load of the fan motor so that a type of clothes may be determined.

A part or portion of the suction body above the first suction surface may be configured to control a flow resistance of outside air passing through the first suction surface in accordance with a load measured by the motor load sensor. A second suction surface may be included so that a suction force may be adjusted corresponding to a type of clothes determined.

A handle connected to the suction body may be held by the user so that the user may more conveniently handle the air purifier. A dust sensor may measure dust in the outside air. When the dust sensor measures that there may be a lot of dust in the outside air, a speed of the fan motor may be increased so that dust may be quickly removed from the clothes. The dust sensor may be provided with an optical sensor provided on a suction surface so that dust may be measured more accurately.

Slits and protrusions may be formed to be elongated in at least one direction in a suction surface so that a contact and suction force may be adjusted corresponding to a total surface area of the garment.

Embodiments disclosed herein may be implemented as an air cleaning or purifying system comprising a main air cleaner or purifier to perform a large-capacity air purifying function and a moving body or handheld air cleaner or purifier that performs a small-capacity air cleaning function smaller than that of the main air purifier. The handheld air purifier may be freely attachable and detachable to and from the main air purifier. The handheld air purifier may be in contact with clothes and suck or suction foreign matter. A cleaning function of the indoor space and clothes may be performed by a single device.

The handheld air purifier may further include a battery which may be charged when the handheld air purifier is seated on the main air purifier so that the handheld air purifier may be used independently from the main air purifier and so that the user may more conveniently use the handheld air purifier.

The main air purifier may be provided with a light emitting portion or light to sterilize the handheld air purifier so that the handheld air purifier may remain in a clean state. The handheld air purifier may be longer in one direction, and when the handheld air purifier is seated on the main air purifier, the handle of the handheld air purifier may extend upward so that the user may easily hold the handheld air purifier and use the handheld air purifier.

Embodiments disclosed herein may remove dust from clothes via a suction or vacuum method, reducing an amount of dust scattering and removing dust in multiple stages to further reduce dust scattering into the room. Since dust may removed by a suction method using the handheld air purifier, an amount of foreign matter that may be accidentally inhaled by a user may be reduced, and dust scattered in the air may be suctioned again by the main air purifier, further reducing a possibility of breathing in dust or other foreign matter.

An operation of the handheld air purifier and an operation of the main air purifier may be synchronized, reducing unnecessary energy use. Since a user of the handheld air purifier may conveniently and safely treat garments, satisfaction may be improved.

Embodiments disclosed herein may be implemented as an air purifier comprising a suction body having at least one opening provided in a lower surface, a fan to suction air through the lower surface, a filter provided adjacent to the opening to filter foreign matter air suctioned through the opening, and a handle extending rearward from the suction body. The suction body, fan, filter, and handle may have a total size and weight configured to be carried and held by a user.

A height of the suction body may be smaller than a width of the suction body. A width of the suction body may be smaller than a length of the suction body.

A bending portion may be provided between the suction body and the handle. The bending portion may bend upward from the suction body to the handle such that the handle is provided to be higher than the suction body. A discharge port may be formed in the bending portion through which air is discharged.

The handle, suction body, and bending portion may form a hollow case. The fan may be provided inside of the hollow case at a position between the suction body and the bending portion.

The fan may be a sirocco fan. A suction port of the sirocco fan may be formed in the suction body and extend in a width direction of the suction body. The sirocco fan may be configured to discharge air toward the bending portion. A battery may be provided inside the handle.

The suction body may include a first suction frame forming an outer side surface of the suction body, the first suction frame including at least one slit, and a second suction frame provided on an inner side of the first suction frame. The second suction frame may have a protrusion configured to insert through the slit of the first suction surface.

The second suction frame may be configured to be moved toward and away from the first suction frame such that the protrusion protrudes through the slit when the second suction frame is moved toward the first suction frame and the protrusion.

The at least one slit may include at least one slit extending in a first direction and at least one slit extending in a second direction. The first direction may be a longitudinal direction of the first suction frame and the second direction may be perpendicular to the first direction. A sensor may be configured to measure an amount of foreign matter in the air adjacent to the suction body.

Embodiments disclosed herein may be implemented as an air purifier comprising a suction body and a handle coupled to the suction body to form a case, a fan provided in the case and configured to suction air, a motor provided in the case to drive the fan, a motor load sensor provided in the case and configured to measure a load on the motor, a filter provided in the case and configured to filter suctioned air, and a suction surface formed on the case through which air is suctioned. The suction surface may include a first suction frame forming an outer surface of the suction surface, and a second suction frame provided on an inner side of the first suction frame. The second suction frame may have at least one protrusion that is configured to penetrate through the first suction frame. A protruding length of the protrusion may be based on the load measured by the motor load sensor to control a flow resistance of air being suctioned through the first suction frame.

A dust sensor may measure foreign matter contained in air adjacent to the suction surface. The fan motor may be driven to increase a speed of the fan when an amount of foreign matter sensed by the dust sensor increases. The dust sensor may be an optical sensor provided in an inner space of the suction body.

At least one slit may be formed in the first suction frame through which the protrusion is inserted in a first direction. The first direction may be a direction from an inner side of the first suction frame to an outer side of the first suction frame. The slit may have a shape extending in a second direction perpendicular to the first direction. The protrusion may have a shape corresponding to a shape of the slit to extend in the second direction.

Embodiments disclosed herein may be implemented as an air purifying system comprising a main air purifier having a mounting portion and a first suction surface formed in the mounting portion, and a handheld air purifier having a cubic feet per minute (CFM) value smaller than that of the main air purifier. The handheld air purifier may be configured to mount on and be lifted from the mounting portion of the main air purifier. The handheld air purifier may include a second suction surface configured to contact the first suction surface such that foreign matter adhered to the second suction surface is suctioned through the first suction surface when the handheld air purifier is mounted on the mounting portion. The main air purifier may include an ultraviolet light emitting diode configured to sterilize the second suction surface.

A handle may extend from the suction body. The mounting portion may be formed as a recess in which the suction body is inserted such that the handle extends upward when the handheld air purifier is mounted in the mounting portion.

It will be apparent to those skilled in the art that various modifications and variations can be made without departing from the spirit or scope of the disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air purifier, comprising:
   a suction body having at least one opening provided in a lower surface;
   a fan to suction air through the lower surface;
   a filter provided adjacent to the opening to filter foreign matter air suctioned through the opening; and
   a handle extending rearward from the suction body, wherein the suction body, fan, filter, and handle have a total size and weight configured to be carried and held by a user,
   wherein the suction body includes:
      a first suction frame forming an outer side surface of the suction body, the first suction frame including at least one opening; and
      a second suction frame provided on an inner side of the first suction frame, the second suction frame having a protrusion configured to insert through the at least one opening of the first suction frame.

2. The air purifier of claim 1, wherein a height of the suction body is smaller than a width of the suction body.

3. The air purifier of claim 1, wherein a width of the suction body is smaller than a length of the suction body.

4. The air purifier of claim 1, further including:
   a bending portion provided between the suction body and the handle, the bending portion bending upward from the suction body to the handle such that the handle is provided to be higher than the suction body; and
   a discharge port formed in the bending portion through which air is discharged.

5. The air purifier of claim 4, wherein the handle, the suction body, and the bending portion form a hollow case, and the fan is provided inside of the hollow case at a position between the suction body and the bending portion.

6. The air purifier of claim 1, wherein the fan is a sirocco fan.

7. The air purifier of claim 6, wherein a suction port of the sirocco fan is formed in the suction body and extends in a width direction of the suction body.

8. The air purifier of claim 6, wherein the air purifier includes a bending portion provided between the suction body and the handle, and wherein the sirocco fan is configured to discharge air toward the bending portion.

9. The air purifier of claim 1, wherein a battery is provided inside the handle.

10. The air purifier of claim 1, wherein the second suction frame is configured to be moved toward and away from the first suction frame such that the protrusion protrudes through the at least one opening when the second suction frame is moved toward the first suction frame and the protrusion.

11. The air purifier of claim 1, wherein the at least one opening includes at least one slit extending in a first direction and at least one slit extending in a second direction, the first direction being a longitudinal direction of the first suction frame and the second direction being perpendicular to the first direction.

12. The air purifier of claim 1, further comprising a sensor configured to measure an amount of foreign matter in the air adjacent to the suction body.

13. An air purifier, comprising:
   a suction body and a handle coupled to the suction body to form a case;
   a fan provided in the case and configured to suction air;
   a motor provided in the case to drive the fan;
   a motor load sensor provided in the case and configured to measure a load on the motor;
   a filter provided in the case and configured to filter suctioned air; and
   a suction surface formed on the case through which air is suctioned and including:
      a first suction frame forming an outer surface of the suction surface; and
      a second suction frame provided on an inner side of the first suction frame, the second suction frame having at least one protrusion that is configured to penetrate through the first suction frame, wherein a protruding length of the protrusion is based on the load measured by the motor load sensor to control a flow resistance of air being suctioned through the first suction frame.

14. The air purifier of claim 13, further comprising a dust sensor to measure foreign matter contained in air adjacent to the suction surface, wherein the fan motor is driven to increase a speed of the fan when an amount of foreign matter sensed by the dust sensor increases.

15. The air purifier of claim 14, wherein the dust sensor is an optical sensor provided in an inner space of the suction body.

16. The air purifier of claim 14, wherein at least one slit is formed in the first suction frame through which the protrusion is inserted in a first direction, the first direction being a direction from an inner side of the first suction frame to an outer side of the first suction frame, and the slit has a shape extending in a second direction perpendicular to the first direction, the protrusion having a shape corresponding to a shape of the slit to extend in the second direction.

* * * * *